United States Patent [19]
MacLean et al.

[11] Patent Number: 5,819,055
[45] Date of Patent: Oct. 6, 1998

[54] METHOD AND APPARATUS FOR DOCKING RE-SIZEABLE INTERFACE BOXES

[75] Inventors: Brendan X. MacLean, Seattle; Bradford A. Christian, Redmond, both of Wash.

[73] Assignee: Microsoft Corporation, Redmond, Wash.

[21] Appl. No.: 354,543

[22] Filed: Dec. 13, 1994

[51] Int. Cl.[6] .................................................. G06F 3/00
[52] U.S. Cl. ............................................................. 395/342
[58] Field of Search ..................................... 395/155–161, 395/152, 326–358; 345/117–120, 127

[56] References Cited

U.S. PATENT DOCUMENTS

| | | | |
|---|---|---|---|
| 5,060,170 | 10/1991 | Bourgeois et al. | 395/158 |
| 5,093,907 | 3/1992 | Hwong et al. | 395/152 |
| 5,146,556 | 9/1992 | Hullot et al. | 395/159 |
| 5,293,326 | 3/1994 | Arima et al. | 345/127 X |
| 5,305,435 | 4/1994 | Bronson | 395/159 |
| 5,367,624 | 11/1994 | Cooper | 395/157 |
| 5,371,847 | 12/1994 | Hargrove | 395/157 |
| 5,398,310 | 3/1995 | Tchao et al. | 395/144 |
| 5,412,776 | 5/1995 | Bloomfield et al. | 395/160 |
| 5,414,806 | 5/1995 | Richards | 395/135 |
| 5,487,143 | 1/1996 | Southgate | 395/157 |
| 5,515,495 | 5/1996 | Ikemoto | 395/159 |

FOREIGN PATENT DOCUMENTS

| | | | |
|---|---|---|---|
| 0 483 777 | 5/1992 | European Pat. Off. | G06F 3/033 |
| 2 693 810 | 1/1994 | France | G06F 3/44 |
| 3618256A | 12/1987 | Germany | G09G 1/00 |
| WO /9429793 | 12/1994 | WIPO | G06F 9/44 |

OTHER PUBLICATIONS

Microsoft Windows Users Guide v1.0, Microsoft Corp., 1985, pp. 16–52.

Cohen et al., "Constraint–Based Tiled Windows", Proceeding of 1st Int. Conf. on Comp. Workstations, Nov. 1994, pp. 2–11.

"For Windows Dashboard™—The Fastest Way to Work in Windows," Hewlett–Packard Co., Owner's Handbook, 1993, pp. 1–89.

(List continued on next page.)

*Primary Examiner*—John E. Breene
*Attorney, Agent, or Firm*—Leydig, Voit & Mayer, Ltd.

[57] ABSTRACT

A method and apparatus are provided for docking re-sizeable graphical user interface (GUI) boxes to a docking region located along a side of a primary GUI box with which the dock is associated. When a first GUI box becomes associated with a dock so that at least one resizeable GUI box is associated with a row of the dock to which the first GUI box is to be added, the dimensions of at least one GUI box associated with the row of the dock are altered automatically so that the docked GUI box occupies a prescribed length of a row of the dock.

In a row containing at least two re-sizeable GUI boxes, a row minor splitter detection region is provided for simultaneously altering the along dimension of at least two of the re-sizeable GUI boxes. In a row containing at least one re-sizeable GUI box, a row major splitter detection region is provided for modifying the across dimension of the row and all re-sizeable windows contained in the row.

63 Claims, 23 Drawing Sheets

OTHER PUBLICATIONS

"From Little Acorns . . . ", Desktop Publishing Today, Dec. 1989/Jan. 1990, pp. 20, 22, 24.

"User's Guide to OS/2 Warp," International Business Machines Corporation, 1994 Chapter 3, pp. 38–43.

"What's New in System 7 Pro–Installation and new capabilities," Apple Computer, Inc., 1993, pp. 16–19.

"User's Guide—Microsoft® Publisher, Desktop Publishing Program, Version 2.0, Windows™ Series," Microsoft Corporation, 1993, pp. 44–45.

Rooney, Paula, "DeScribe, Lotus tackle 32–bit WP," PC Week, Nov. 9, 1992, NEWS p. 26.

Fernandez, Charles V. "A Graphical User Interface for a Multimedia Environment," Hewlett–Packard Journal, Apr. 1994, pp. 20–22.

"Norton Desktop™ for Windows User's Guide—The Norton Desktop," Symantec Corporation, 1993, pp. 4–1 to 4–9; 5–1 to 5–7; 6–1 to 6–11.

Simon, Barry, "HP Squeezes More Tools into Slim Dashboard 2.0" PC Magazine, Sep. 28, 1993, p. 50.

Methvin, David (Ed.), "Dashboard—Utilities at Your Fingertips," Windows Magazine, Sep. 1, 1993, Issue 409, p. 96.

"New version of Dashboard from HP has more than 25 new features and enhancements; Dashboard seeds past competitors as sales exceed 300,000 units,": Business Wire, Aug. 9, 1993.

Haskin, David, "Sick of clunky Windows? HP's new Dashboard to the rescue," PC–Computing, Sep. 1993, vol. 6(9), p. 48.

Safi, Quabidur, "HP's Dashboard eases Window use," PC Week, Aug. 9, 1993, vol. 10(31), p. 81.

Gillliand, Steve, "Dashboard 1.0," PC Sources, May 1993, vol. 4(5), p. 263.

Simon, Barry, "Launching programs," PC–Computing, Apr. 1993, vol. 6(4), p. 119.

Pompili, Tony, "Dashboard puts the user in the driver's seat," Windows Sources, Feb., 1993, vol. 1(1), p. 248.

Ayre, Rick, "Dashboard for windows," PC Magazine, Jan. 12, 1993, vol. 12(1), p. 120.

Hart, Ken, "HP's Dashboard aids users in the fast lane," Computer Shopper Jan. 1993, vol. 13(1), p. 588.

Morgan, Cynthia, "Why buy the car when you can get the Dashboard for $99?," Government Computer News, Dec. 21, 1992, vol. 11(26), p. 46.

Bigley, Tom, "Dashboard adds useful goodies to Windows," InfoWorld, Dec. 7, 1992, vol. 14(49), p. 136.

Grevstad, Eric, "Dashboard keeps Windows on board," Computer Shopper, Nov. 1992, vol. 12(11), p. 694.

Radosevich, Lynda, "Dashboard for Windows", Lotus, Nov. 1992, vol. 8(11), p. 72.

Beattie, Rob, "Dash it all!" PC User, Oct. 21, 1992, No. 196, p. 53.

Sheldon, Kenneth M., "HP's push–button Dashboard for Windows," Byte, Oct. 1992, vol. 17(10), p. 64.

Kehoe, Mike Bo., "Paradise by the dashboard lights," HP Professional, Oct. 1992, vol. 6(10), p. 38.

"Drive Windows by the light of the Dashboard," PC World, Oct. 1992, vol. 10(10), p. 52.

Finnie, Scot, "HP's spashy dashboard," PC–Computing, Oct. 1992, vol. 5(10), p. 90.

Simon, Barry, "The cabbage patch," PC Magazine, Sep. 29, 1992, vol. 11(16), p. 177.

Simon, Barry, "The cabbage patch, " PC Magazine, Sep. 29, 1992, vol. 11(16), p. 177.

Scannell, Ed, "Dashboard tunes up handling of windowed applications," InfoWorld, Sep. 14, 1992, vol. 14(37), p. 24.

Clancy, Heather, "HP delivers $99 'Dashboard' Windows utility," Computer Reseller News, Sep. 7, 1992, No. 490, p. 57.

"Windows: HP ships Dashboard for Windows; new utility gives users a faster way to work in Windows," EDGE: Work–Group Computing Report, Sep. 7, 1992, vol. 3 (120), p. 4.

Rohbrough, Linda, "New for Windows: HP's Dashboard—updated report," Newsbytes, Sep. 4, 1992.

Rohbrough, Linda, "New for Windows: HP's Dashboard—race car metaphor," Newsbytes, Sep. 3, 1992.

IBM Corporation, "ICON Safe Zone," *Technical Disclosure Bulletin* 35(6):34–35, Nov. 1992.

Anonymous, "Graphical Window List System," *Research Disclosure* 348:270 (entire document), Ensworth, GB, Apr. 1993.

Microsoft Excel 4.0 User's Guide 1, 1992, pp. 251–253.

Microsoft Excel 4.0 User's Guide 2, 1992, pp. 154–160.

Microsoft Corporation, "Microsoft C—Installing and Using the Professional Development System," 1990, pp. 54–55.

| | |
|---|---|
| Pointer to Frame (Main Application Window) | 40 |
| Pointer to View (MDI Client Window) | 42 |
| Visible | 44 |
| Delayed Show | 46 |
| Floating Child Window List | 52 |
| MDI Child Window List | 54 |
| Dock Worker List (one worker per dockable window, See Fig. 6) | 56 |
| Dock Array (one dock element per dock in Parent Application Window, See Fig. 8) | 58 |

Dock Manager

FIG. 5

| | |
|---|---|
| Pointer to Dockable Window | 60 |
| Dockable Window Identification | 62 |
| Docktype | 64 |
| Dockable to Horizontal dock | 66 |
| Dockable to Vertical Dock | 68 |
| Position | 70 |
| Ask | 72 |
| Visible | 74 |
| Available | 76 |
| MDI | 78 |
| Loading | 80 |
| Dock Position (Top, Bottom, Left, Right Hidden, or Floating ) | 84 |
| Across Dimension of Last Docked Window (Horizontal and Vertical) | 86 |
| Floating Window Size and Location | 88 |
| Window Title | 90 |
| Pointer to Dock Manager | 92 |
| Dock Placement (See Fig. 7) | 94 |

Dock Worker

FIG. 6

| | |
|---|---|
| Dock Position | 95 |
| Row Identification | 96 |
| Position | 97 |
| Along Dimension | 98 |
| Across Dimension | 99 |

FIG. 7

| Dock Position | 100 |
|---|---|
| Along Dimension | 102 |
| Row Count | 104 |
| Array of Row Records (one per row, See Fig. 9) | 106 |
| Next Row ID | 118 |
| Previous Row ID | 120 |
| Initialized | 122 |
| Pointer to Dock Manager | 124 |

Dock

FIG. 8

| Pixel Position of Row | 108 |
|---|---|
| Row Identification | 110 |
| Re-sizeable Windows Exist | 112 |
| Minor Splitter Counter | 114 |
| Array of Minor Splitters (splitter positions) | 116 |

Row Record

FIG. 9

| Window Identification | 130 |
|---|---|
| Window Caption | 132 |
| Flags | 134 |
| Dock Type | 136 |
| Dock Position | 138 |
| Floating Window (Size and Location) | 140 |

Dock Initialization Structure

FIG. 10

| Row Identification | 142 |
|---|---|
| Position (in row) | 144 |
| Along Dimension | 146 |
| Across Dimension | 148 |
| Window pointer | 150 |

Docked Window Information Record

FIG. 11

Row Minor Manipulation

METHOD AND APPARATUS FOR DOCKING RE-SIZEABLE INTERFACE BOXES

AREA OF THE INVENTION

This invention relates generally to computer display interfaces and more particularly to computer display interfaces capable of simultaneously displaying a plurality of separate, mobile and re-sizeable display regions, referred to herein as graphical user interface (GUI) boxes. The GUI boxes include, for example, windows which are a well known interface element supported by the "WINDOWS" (TM Microsoft Corporation) operating system.

BACKGROUND OF THE INVENTION

A desirable feature present today in computer session graphical user interfaces is the ability to concurrently display a plurality of GUI boxes associated with computer resources on a computer display interface. (See FIG. 1). Independent information associated with each GUI box provides directions to the operating system for positioning each GUI box. In addition to being capable of repositioning via known drag and drop operations, the GUI boxes often have the ability to re-size via re-sizing commands applied to one or more selected borders of a GUI box. In such graphical user interfaces, repositioning and re-sizing of a GUI box is accomplished by, for example, a drag and drop operation on the GUI box or an edge of the GUI box.

The advantages of concurrently displaying the plurality of GUI boxes are readily observed when using such interfaces. For example, a user may switch focus quickly between concurrently displayed GUI boxes. A user may observe changes in other GUI boxes resulting from actions taken in a first GUI box on the graphical user interface. In yet another situation involving multiple GUI boxes, the status of a process associated with a first GUI box is monitored while work is performed in another GUI box. The above advantages are provided by applications running under the "WINDOWS" operating system or any other graphical user interface providing simultaneous display of a plurality of GUI boxes.

Significant additional advantages are provided when the above graphical user interfaces enable a user to adjust the position of the GUI boxes on the display screen. For instance, a user may position the most important GUI box in a prominent, easy to view, location on the display screen. GUI boxes of ancillary importance are relocated to the edges of the screen. As the focus changes with respect to the importance of a particular GUI box, the position of the GUI box is modified by the user accordingly.

The "WINDOWS" operating system as well as other systems providing graphical user interfaces, maintain a hierarchy of GUI boxes. In such graphical user interfaces, a "child" GUI box is logically (and typically visually) contained within a "parent" GUI box. In instances where a work area of a parent GUI box occupies less than the entire screen, moving a child graphical user interface box so that its border would lie outside the work area typically causes clipping of the portion of the child interface box which would lie outside the work area of the parent GUI box.

It is known to display child GUI boxes in a "floating" state. (See FIG. 3B). In the floating state, the child GUI box is not confined by the borders of the work area of a parent GUI box. Instead the portion of the floating GUI box lying outside the work area of the parent GUI box is displayed (i.e., there is no clipping of the child interface box). While this may be advantageous in certain instances, portions of floating child windows lying outside a corresponding parent window may cover over portions of other parent windows. The user may therefore need to reposition the floating window in order to enable a user to access resources within the other parent window.

Additional significant advantages are provided when the above mentioned graphical user interfaces enable a user to re-size the dimensions of the GUI boxes displayed upon the screen. When a screen contains a plurality of GUI boxes, the importance of re-sizing the GUI boxes in order to conserve space on the display screen for display of the other GUI boxes takes on increased importance. GUI boxes having significant blank area may be re-sized by the user in order to eliminate this wasted area from the graphical user interface. Reducing the size of a GUI box leaves greater room for concurrently displaying the contents of other GUI boxes.

The known graphical user interfaces having the above described capability of repositioning and re-sizing GUI boxes, though providing the above significant advantages, have certain drawbacks which mitigate against a user taking full advantage of the capability to reposition and re-size the GUI boxes. In particular, arranging more than two display GUI boxes on a screen by repositioning and re-sizing borders is very cumbersome and involves the user performing a large number of drag and drop operations on the GUI boxes and the re-sizeable perimeters of the GUI boxes. As a result, a user is not likely to take advantage of GUI boxes' re-sizing and repositioning capabilities when more than a couple GUI boxes are involved.

Furthermore, even when a user is willing to go to the extra effort of setting up a relatively complex display screen layout containing several GUI boxes, the time spent laying out the GUI boxes is essentially wasted time in regard to the completion of the computing task. Minimizing this "wasted" time enhances the desirability and utility of re-sizeable and re-positionable GUI boxes.

Computer interfaces are designed for use by a wide spectrum of potential users having varying degrees of motor skills. Though grabbing and dragging a graphical user interface target such as a re-sizing bar is a relatively easy task for most users, others may find this task difficult. Even a user having superior motor skills likely prefers to minimize the frequency of performing drag and drop operations in conjunction with laying out a display screen having a plurality of GUI boxes of various dimensions. Therefore, minimizing the number of drag and drop operations on GUI box re-sizing bars in order to create a desirable interface layout is clearly desirable.

It is aesthetically pleasing and sometimes necessary to present a plurality of GUI boxes in an orderly non-overlapping manner. However, repositioning and re-sizing the GUI boxes to remove overlap between the GUI boxes (which may obscure important display information) and matching the edges of the GUI boxes is clearly impractical in the known systems which do not provide mechanisms for automatically re-sizing and repositioning the adjacent GUI boxes. Furthermore, adding a new GUI box to the arranged screen layout, or repositioning or re-sizing one of the GUI boxes requires separate re-sizing and/or repositioning of the other adjacent GUI boxes in order to restore the display screen to an orderly state or at least to one in which important sections of other GUI boxes are not obscured.

SUMMARY OF THE INVENTION

It is an object of the present invention to enable a user to easily organize a plurality of independently re-positionable and re-sizeable GUI boxes on a graphical user interface.

It is another object of the present invention to enable a user to easily reorganize a plurality of independently re-positionable and re-sizeable GUI boxes on a graphical user interface.

It is yet another object of the present invention to reduce the time and effort expended by a user in arranging independently re-positionable and re-sizeable GUI boxes on a graphical user interface.

It is another related object to reduce the quantity of drag and drop operations needed to organize a set of independently re-positionable and re-sizeable GUI boxes on a graphical user interface.

The above and other objects are achieved by a graphical user interface comprising at least one dock upon which a plurality of re-sizeable GUI boxes are positioned. Re-sizing of the re-sizeable GUI boxes associated with the dock is executed without manipulation of re-sizing borders of individual GUI boxes in order to display the plurality of re-sizeable GUI boxes in a non-overlapping manner within a prescribed region of the dock. The re-sizing operations on one or more docked GUI boxes is invoked during the adding of a GUI box to the dock, repositioning a GUI box within the dock, removing a GUI box from the dock, and when one or more GUI boxes are re-sized via re-positioning of re-sizing regions associated with the dock.

A dock row runs parallel to a border of a parent GUI box to which a dock is associated. In accordance with a particular aspect of the present invention the dimension of at least one re-sizeable GUI box in the dock row is re-sized in accordance with a dimension specified by the dock when a GUI box is added to a row within the dock such that at least one re-sizeable GUI box is associated with the dock row.

In accordance with another aspect of the invention, a dock row may hold a plurality of GUI boxes. The dock row is provided with at least one row re-sizing detection region for re-sizing an across dimension for all re-sizeable GUI boxes within the dock row via a single drag and drop operation.

In yet another related aspect of the invention, the graphical user interface includes at least one vertically oriented dock and one horizontally oriented dock. The vertically oriented dock is disposed upon one of the sides of a parent GUI box containing the dock, and the horizontally oriented dock is disposed upon a top or bottom of the parent GUI box. In order to avoid overlap when a first one of the docks is re-sized in the across direction by a user (i.e., in a direction perpendicular to the border of the parent GUI box with which the re-sized dock is associated), a second one of the docks, orthogonally oriented with respect to the dock re-sized in the across dimension, is re-sized in the along dimension (i.e. in a direction parallel to the border of the parent GUI box with which the re-sized second dock is associated) without direct manipulation of a re-sizing border on the second dock.

Another aspect of the present invention is the ability to re-size an along dimension of a plurality of re-sizeable GUI boxes in a row by means of a single drag and drop operation on a GUI box re-sizing detection region, such as a bar, disposed between two re-sizeable GUI boxes in the row. The moving of the re-sizing target to a new position in the row causes the expansion of a first GUI box on one side of the re-sizing target and the contraction of a second GUI box on the other side of the re-sizing target.

In accordance with yet another aspect of the present invention, a dockable, re-sizeable GUI box is transformed to a hidden state in accordance with a user command. During transformation to the hidden state, the previous display state of the GUI box is saved. If the GUI box was docked prior to being hidden, then a row identification, position, and docked GUI box dimensions are saved for the GUI box in association with the transformation of the display state of the GUI box to a hidden state. When the GUI box is transformed to a displayed state from the hidden state, the GUI box is replaced upon the dock with which it was previously associated. The placement of the GUI box on the dock is governed by the row, position, and dimension information previously stored when the GUI box was transformed to a hidden state.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 5 is a schematic illustration of a Dock Manager structure for organizing dock information;

FIG. 6 is a schematic depiction for a Dock Worker element of the type pointed to by one of the list elements in the Dock Worker List of the Dock Manager of FIG. 5;

FIG. 7 is a schematic depiction of the sub-fields of a Dock Placement field in a dock worker structure of FIG. 6;

FIG. 8 is a schematic depiction for a Dock element of the type pointed to by one of the array elements of the Dock Array in the Dock Manager of FIG. 5;

FIG. 9 is a schematic depiction for a Row Record of the type included in the Array of Row Records in the Dock element of FIG. 8;

FIG. 10 is a schematic depiction of an initialization structure associated with each dockable window and providing the information needed to create a dockable window;

FIG. 11 is a schematic depiction of a Docked Window Information record for facilitating the recalculation of the content and appearance characteristics of windows within a modified dock;

DETAILED DESCRIPTION OF THE DRAWINGS

It is first noted that the term "window" typically refers to a specific type of display interface box associated with the "WINDOWS" (TM Microsoft Corporation) Operating System. However, the invention defined by the claims appended below is intended to cover more than the graphical user interface entities created by the "WINDOWS" (TM) Operating System. The invention is intended to include a re-positionable graphical user interface entity having a perimeter defining a region of a graphical user interface allocated to an associated computer resource. Such an entity is referred to in the claims as a graphical user interface (GUI) box. Furthermore, it is noted that the term "GUI box", used to describe the present invention, is intended to include non-box shaped re-positionable and re-sizeable GUI elements which occupy a defined region on a graphical user interface.

Figure 1:
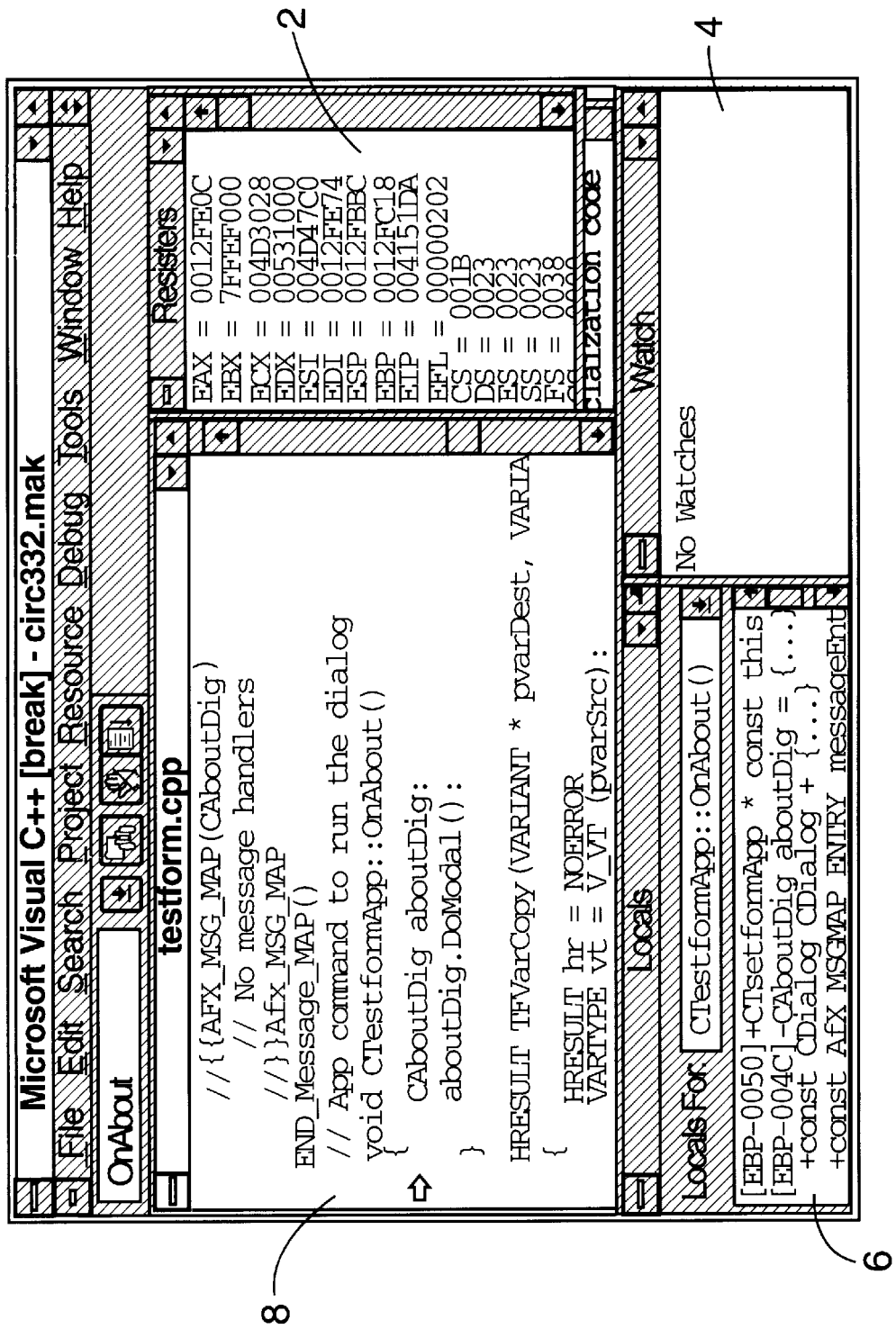
FIG. 1 is an illustrated exemplary interface display for a prior art multiple document interface (MDI) supporting the concurrent display of a plurality of windows.

Turning now to FIG. 1, an exemplary display is provided for a prior art multiple document interface (MDI) supporting the concurrent display of a plurality of windows. In this example, a user has positioned in a non-overlapping manner a Registers window 2 on the right side and a Watch window 4 and Locals window 6 on the bottom of the display interface. A window 8 displaying the contents of a source code file has been sized and positioned to occupy the remaining available space of the parent window entitled "Microsoft Visual C++[break]—circ332.mak." In order to achieve the illustrated display state of non-overlapping windows, a user must execute a large number of move and re-sizing commands. Furthermore, after achieving the display state displayed in FIG. 1, re-sizing one of the windows requires separate re-sizing of at least one of the other windows in order to achieve a non-overlapping display state in which the display space is totally utilized by the windows.

Figure 2:
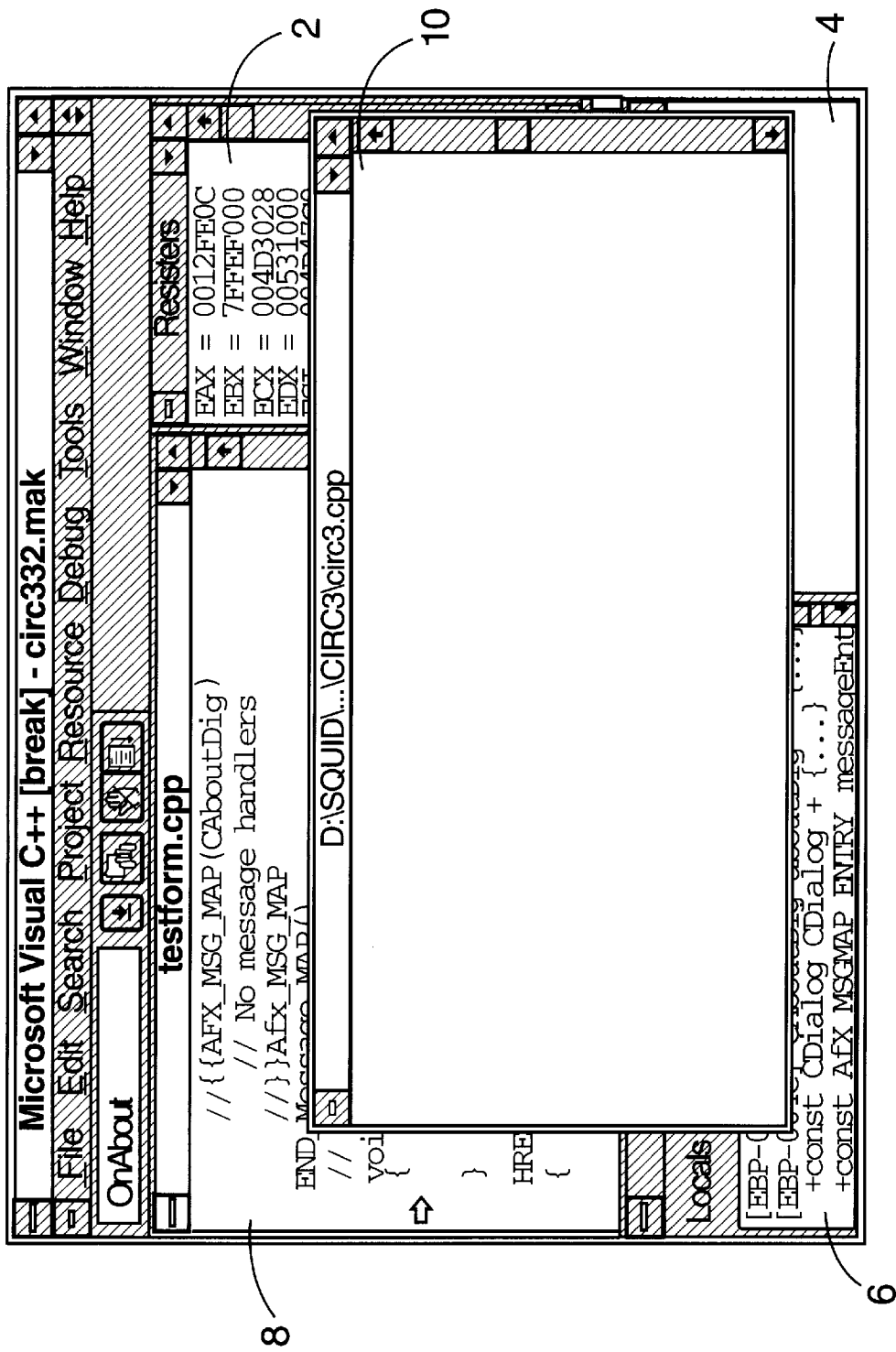
FIG. 2 is an illustrated exemplary prior art interface display showing a shortcoming of a prior art MDI.

FIG. 2 displays a second shortcoming of a prior art MDI. When a new document is opened thus creating a new document window 10, the layout displayed in FIG. 1 which the user has spent considerable effort to achieve is partially obscured by the new document window 10. In order to restore the Registers window 2, the Watch window 4, and the Locals window 6 to full, unobscured view, the user must execute a plurality of move and/or re-sizing commands. Furthermore, maximization of any one of the windows will obscure the view of the Registers window 2, the Watch window 4, and the Locals window 6.

Figure 3A:
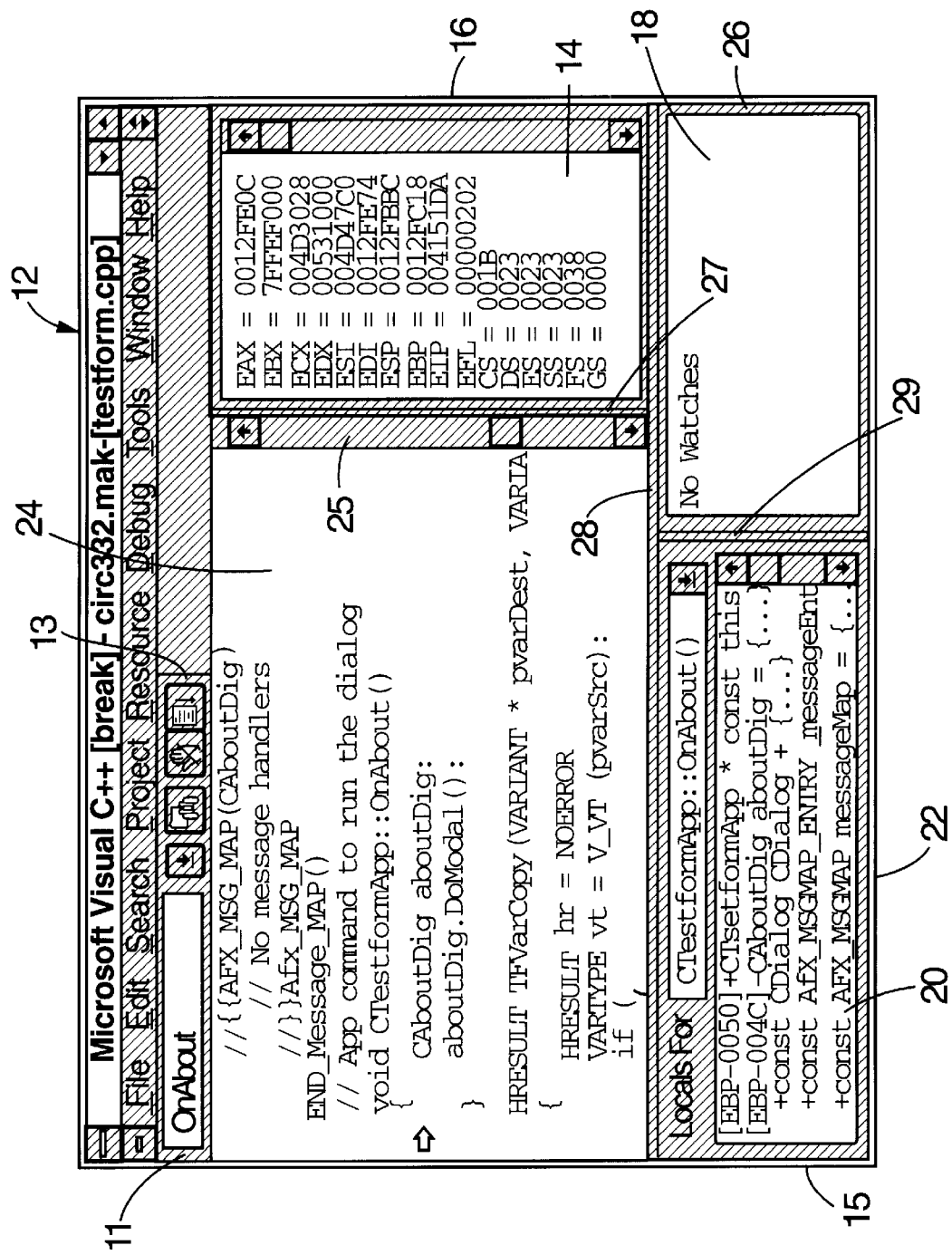
FIG. 3A is an illustrative example of a graphical user interface for a "WINDOWS" (TM) based application incorporating the present invention.

Turning now to FIG. 3A, an illustrative example is provided of a graphical user interface for a "WINDOWS" (TM) based application incorporating the present invention. A parent application window 12, entitled "Microsoft Visual C++[break]—circ332.mak—[testform.cpp]," includes a maximum work area. The maximum work area comprises the region of the display screen bordered by two side borders 15 and 16 and a bottom border 22 of the display screen of FIG. 3A, and bordered on the top by a non-resizeable row 11 containing a toolbar 13.

The illustrative display interface depicted in FIG. 3A includes four docks. Each one of the four docks is associated with one of the four borders of the maximum work area of the parent application window 12. It is noted that in the illustrative embodiment of the present invention the docks are only visually perceivable when at least one window is docked to the dock. In an alternative embodiment of the invention, a visual indicator of the presence of a dock is displayed upon the graphical user interface when the dock is empty in order to indicate the existence of the dock.

Each dock is associated with a detection zone (discussed in greater detail below in association with FIGS. 12A and 13) disposed along a corresponding border of the maximum work area of the parent application window 12. A user causes a dockable window to become associated with a particular dock by dragging and dropping the dockable window within a detection zone for the particular dock. While it is preferred to use drag and drop operations to dock windows, alternative means for causing a dockable window to become associated with a dock will be known to those skilled in the art in view of the description contained herein such as, for example, menu and keyboard invoked commands.

In the illustrative example displayed in FIG. 3A, a dockable Registers window 14 displaying a set of registers for the Visual C++ application program is associated with a dock for the right border 16 of the parent application window 12. A dockable Watch window 18 and a dockable Locals window 20 are associated with a dock for the bottom border 22 of the maximum work area for the parent application window 12. It is noted that in order to avoid overlap of docks and docked windows, the length of vertically oriented docks are reduced automatically by the graphical user interface to accommodate display of horizontally oriented docks along substantially the entire width of the parent application window 12. However, in alternative embodiments the vertically oriented docks extend along substantially the entire vertical distance of the maximum work area of the parent application 12 and limit the length of the horizontally oriented docks.

Furthermore, in the illustrative embodiment of the present invention, the docked windows 14, 18 and 20 confine the available work area to a work area 24, which in the present example displays lines of source code for a computer program and a scroll bar 25. Thus, in accordance with the illustrative embodiment of the present invention, a computer resource having a display interface associated with the work area 24 of the parent window (referred to as an "MDI child" window) is constrained by the docked windows 14, 18, and 20 to the work area 24. MDI child windows are clipped by the scroll bar 25 and the other borders of the work area 24.

When a dockable window is docked, the display interface is modified by removing the title bar in order to give the docked window a smaller profile. Comparing the non-docked Watch window 4 displayed in FIG. 1 to the docked Watch window 18 in FIG. 3A, a title bar containing the title "Watch" and the close, maximize and minimize icons displayed for the "Watch" window 4 in FIG. 1 is hidden in the docked watch window 18. The title bars for all docked windows including docked windows 14 and 20 are removed. The document space (or work area) of the docked windows, though re-sized in order to fill a prescribed portion of a dock, is maintained when a window is transformed to the docked display state. This display trait of docked dockable windows desirably conserves the limited display space available for presenting the docked windows.

Figure 3B:
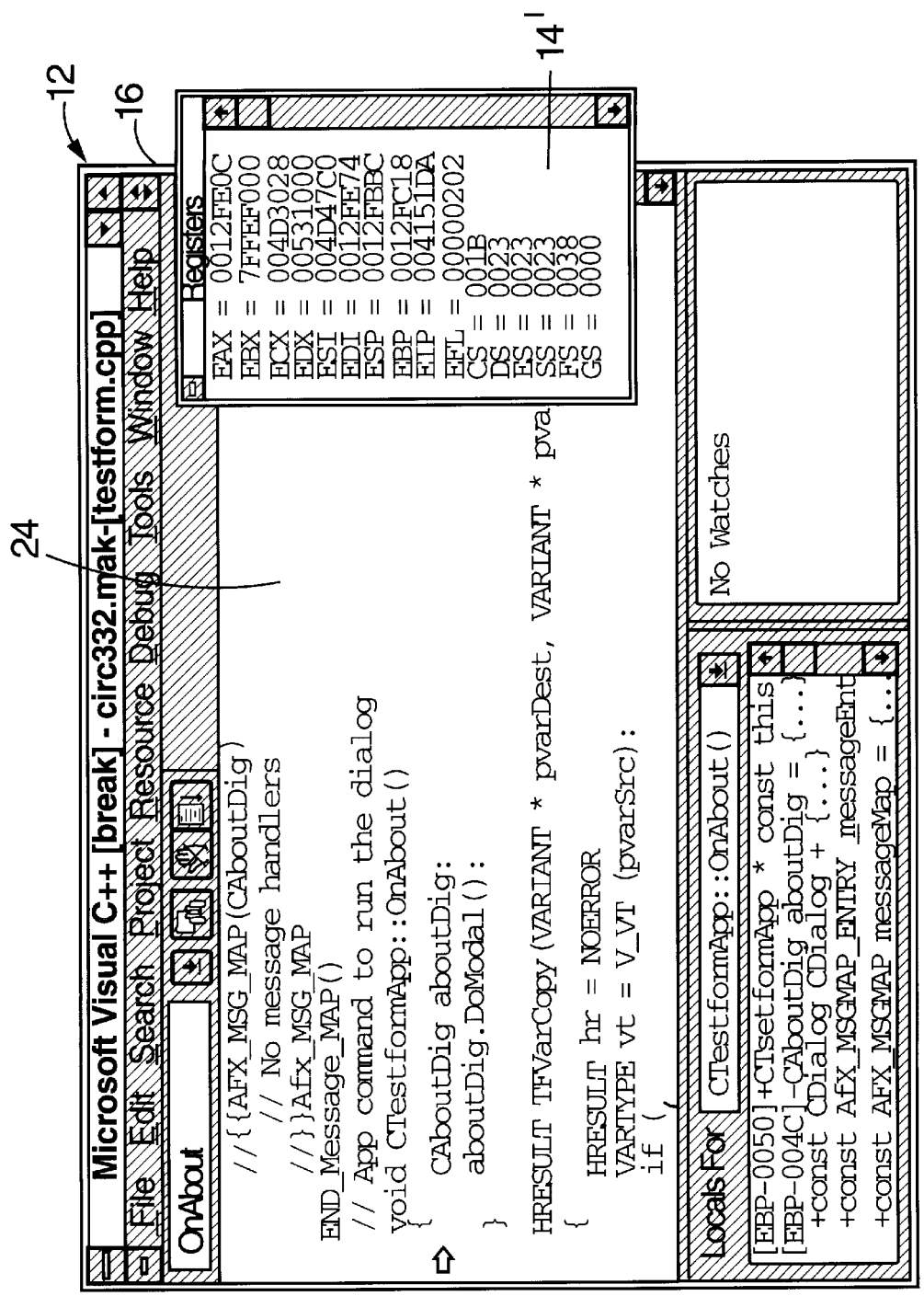
FIG. 3B is another illustrative example of a graphical user interface for a "WINDOWS" (TM) based application incorporating the present invention wherein a window is shown in the floating state.

In the illustrative embodiment of the present invention, dockable windows include at least two display states: (1) floating above the main application window as palettes and (2) docked to one of the docks. Turning briefly to FIG. 3B, a display screen similar to the screen of FIG. 3A is displayed. However, in FIG. 3B the Registers window 14' is shown in the floating state instead of the docked state (depicted in FIG. 3A). When in the floating state, dockable windows are not confined by the borders of the work area 24 or the maximum work area of the parent application window 12. Thus, a portion of the floating Registers window 14' is displayed outside the right border 16 of the parent application window 12 instead of being clipped by the borders of the work area 24.

Returning to FIG. 3A, in accordance with yet another feature of the illustrative embodiment of the present invention, the re-sizing regions associated with the sides of floating dockable windows are replaced by a move border in docked windows. The move borders are detection regions positioned on the perimeter of the docked windows for moving a docked window to a new location in a dock or removing a window from a dock via a drag and drop operation using a mouse and display pointer interface device.

In the illustrative embodiment depicted in FIG. 3A, move borders, are represented visually by a graphic border around the perimeter of a docked window such as, for example, move border 26 for dockable window 18. However, in other embodiments, the move border may comprise a detection region associated with another region of a docked window. In yet other alternative embodiments the move border is merely a detection region associated with a docked window image on a graphical user interface having no specifically associated graphic target border or other suitable graphic target image.

Before describing additional features associated with the illustrative embodiment of the present invention, certain dimensions associated with the docks and the dockable windows will be defined. The dimension of a dockable window or dock row running parallel to an associated side of the parent application window 12 containing the relevant dock will be referred to herein as the "along" dimension. The dimension of a window or dock row running perpendicular to an associated side of the parent application window 12 containing the relevant dock will be referred to herein as the "across" dimension.

Re-sizing of docked windows is carried out in the illustrative embodiment of the present invention by re-sizing bars associated with the rows of the docked windows. Graphic user interface target images corresponding to the re-sizing bars are presented on the illustrative display screen in the form of row major splitter bars 27 and 28, and a row minor splitter bar 29. In the illustrative embodiment, the row major splitter bar 28 associated with a horizontal dock spans substantially the entire parent application window 12. The row major splitter bar 27 associated with a vertical dock spans the length of the right dock. The row minor splitter bar 29 spans substantially the across dimension of the row with which it is associated.

Row minor splitter bars are disposed between two windows on a same dock row wherein at least one of the two windows is a re-sizeable window. A row minor splitter bar is repositioned in a new position within a row via a drag and drop operation executed by a user on the row minor splitter bar in order to adjust the position of at least one border between two docked windows in the row via a single drag-and-drop operation. After dragging and dropping the row minor splitter, the border between the two docked windows adjacent the row minor splitter is relocated to the position where the row minor splitter is dropped.

In the preferred embodiment of the present invention, the docked re-sizeable windows within a row re-size when necessary to occupy the entire along dimension of the row. Row minor splitter bars exist only in rows having at least two re-sizeable windows. In such rows, increasing or decreasing the along dimension of a first window on a row via a row minor splitter bar causes a complementary decreasing or increasing of the along dimension of at least a second window on the row.

Figure 4:
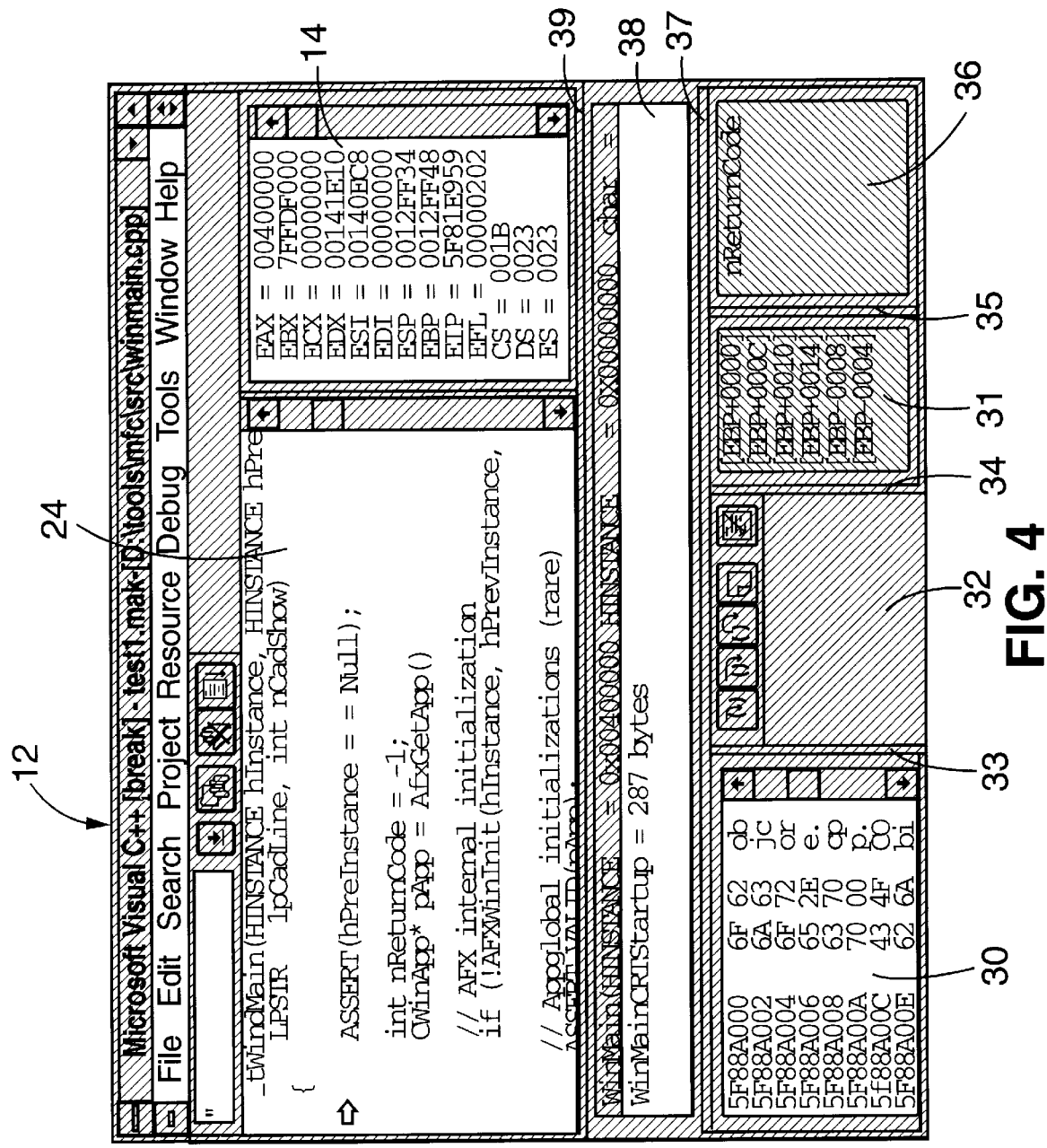
FIG. 4 is yet another illustrative example of a graphical user interface for a "WINDOWS" (TM) based application incorporating the present invention wherein a dock includes multiple row major splitter bars and multiple row minor splitter bars.

Turning to FIG. 4 yet another illustrative screen display is provided. In accordance with one aspect of the present invention, the re-sizeable windows need not be adjacent to one another, and more than a single border between windows in a row may be moved in a single drag and drop operation on a row minor splitter bar. A row may comprise a first re-sizeable window 30 and a second re-sizeable window 31 separated by a non-stretching docked window 32 having a fixed along dimension. Re-sizing of the first re-sizeable window 30 via the row minor splitter bar 33 causes a complementary change in the second re-sizeable window 31. Only the position of the non-stretching docked window 32 is modified.

One may move a plurality of row minor splitters via a single drag and drop operation on one of the row minor splitters. In the example illustrated in FIG. 4, moving a first row minor splitter bar 34 in a direction toward a second row minor splitter bar 35, and then moving the first row minor splitter bar 34 past the second re-sizeable window 31's minimum along dimension, will cause repositioning of the second row minor splitter bar 35 in the same direction as the repositioning of the first row minor splitter bar 34. The distance the second row minor splitter bar 35 is repositioned is determined by the additional distance the first row minor splitter bar 34 is dragged after the first re-sizeable window 31 has decreased to a minimum width. It is further noted that a third re-sizeable window 36 re-sizes in accordance with the re-positioning of the second row minor splitter bar 35.

Row major splitter bars facilitate re-sizing the across dimension of an associated dock row. With continuing reference to FIG. 4, re-sizing the across dimension of the row containing windows 30, 31, 32 and 36 is accomplished in the illustrative embodiment of the present invention by positioning a mouse-controlled pointer within a detection region represented by the row major splitter 37 and dragging the row major splitter 37 to a new location relative to the bottom border 22 of the maximum work area. Re-sizeable windows 30, 31 and 36 in the row re-size their across dimension in accordance with the new location of the row major splitter 37.

When a single dock comprises a plurality of rows (as in FIG. 4), each row is associated with a row major splitter for re-sizing the across dimension of the associated row. The across dimension of a row is modified by dragging and dropping a row major splitter associated with the row. Therefore, in regard to the across dimensions of rows, moving the row major splitter 37 affects only the across dimension for the row containing windows 30, 31, 32 and 36.

The position of a second row on a dock is affected by a change to the across dimension of a first row disposed between the first row and a side of the maximum work area of a parent application window 12 with which the dock is associated. For example, row major splitter 37 (associated with the row containing windows 30, 31, 32 and 36) is disposed between a row containing a re-sizeable window 38 (associated with a second row major splitter 39) and the bottom border 22 of a parent window 12). Therefore, when the row major splitter 37 is moved, the position of the row containing the window 39 is altered in accordance with the positional change of the row major splitter 37. Furthermore, the along dimension of the right side dock containing the docked Registers window 14 is modified in accordance with the new across dimension of the bottom dock when one of the row major splitter bars 37 or 38 on the horizontal dock is moved.

Finally, as previously mentioned, the across dimensions of other rows on a dock do not change when the across dimension of a row on the dock is re-sized via a row major splitter bar. Therefore, movement of a row major splitter causes re-sizing of the across dimension of an associated dock. The change in the across dimension of the associated dock requires re-sizing of the work area 24 of the parent application window 12.

With respect to the re-sizing bars, it is noted that in the illustrative display screens depicted in FIGS. 3A, 3B, and 4, the re-sizing bars are disposed along the edges of the associated windows and rows. However, in alternative embodiments of the present invention, the re-sizing bars may include a different detection region for re-sizing docked windows. For example, in alternative embodiments, re-sizing bars are merely detection regions on a graphical user interface having no associated displayed targets such as the displayed splitter bar target images.

Furthermore, in the illustrative example of FIGS. 3A, 3B and 4, the parent application is the well known Visual C++ programming application. However, the present invention is applicable to any display interface in which it is desirable to maintain a set of concurrently displayed windows or similar mobile, re-sizeable, independently modified display interface regions in a non-overlapping, orderly arrangement.

Having described the visual appearance of an illustrative embodiment of an application interface incorporating the present invention, attention is now directed to the data structures which provide the framework for the above described interface supporting dockable, re-sizeable computer resource interfaces.

Turning now to FIG. 5, a Dock Manager data structure is schematically depicted. In the illustrative embodiment of the present invention the Dock Manager includes a pointer to the Main Application Window 40, and a pointer to an MDI Client Window 42.

The Dock Manager also includes boolean variables defining the current state of the Dock Manager. A Visible variable 44 defines whether or not the docks and their associated windows are displayed on the Main Application Window. A Delayed Show variable 46 defines whether the visible state of the dock and docked windows is to be modified when the application containing the dock reaches an idle state.

The Dock Manager also includes lists of all the windows associated with a Main Application Window. A Floating Child Window list 52 identifies the set of dockable windows currently displayed as floating palettes upon a graphical user interface in conjunction with the Main Application Window. An MDI Child Window List 54 identifies the set of dockable windows currently associated with an MDI Client Window of the Main Application Window. The Dock Manager also includes a Dock Worker List 56 containing a list of pointers to a set of Dock Worker data structures. The Dock Worker data structure schematically depicted in FIG. 6 is described in greater detail below. There exists one entry in the Dock Worker list for each dockable window.

Finally, the Dock Manager also includes a Dock Array 58. The Dock Array 58 includes four (4) elements, one element per dock in the parent application window. Each of the four elements describes the state and content of one of the four docks associated with the Main Application Window. The Dock data structures are described in detail below in conjunction with the schematic depiction in FIG. 8.

Turning now to FIG. 6, a schematic depiction is provided of a Dock Worker element of the type pointed to by one of the list elements in the Dock Worker List 56. A pointer to Dockable Window 60 specifies a dockable window associated with the dock worker. The value of the pointer to Dockable Window 60 is null if the window is not displayed. A Dockable Window Identification 62 is a unique identifier designated by the application programmer for a dockable window.

A Docktype 64 defines the type of dockable window associated with the worker thereby allowing the dock manager to treat different types differently. A type designation of "dtEdit" indicates that the dockable window is of the floating type which is capable of having a border outside the parent application window. A type designation of "dtBorder" indicates that the dockable window is a type for which a border is provided in a known manner when the window is displayed.

Next, the Dock Worker includes two boolean variables, Dockable to Horizontal Dock 66 and Dockable to Vertical Dock 68, identifying whether the window is dockable to the top or bottom dock, or the left or right dock respectively. The Dock Worker also includes the following additional boolean variables. A Position variable 70 identifies whether a Floating Window Size and Location field 88 (described below) contains valid information. A FALSE value indicates that valid information is present. A TRUE value indicates that the information is invalid, and the application should generate and save new values for the Floating Window Size and Location field 88.

An Ask variable 72 determines whether the window wishes to be asked its visible state when the application reaches an idle state. Dockable windows wishing to have their visibility state checked when the application is in an idle state, set the Ask variable 72 to TRUE. A Visible variable 74 indicates whether or not the associated dockable window is currently displayed on the graphical user interface. An Available variable 76 is used in combination with the Visible variable 74 in order to indicate whether the associated dockable window can be displayed. A window is shown when the Visible variable 74 and Available variable 76 are both TRUE. An MDI variable 78 defines whether the window is currently associated with the MDI Client window of the parent application window. A Loading variable 80 identifies whether the worker is being loaded from a saved state.

The following fields of a Dock Worker provide addition state information for positioning and displaying a dockable window when switching the state of the dockable window between docked and floating states. A Dock Position field 84 identifies the dock, if any, to which the dockable window is associated. Alternatively, the Dock Position field 84 specifies a "floating" or "hidden" position to indicate respectively that the window is a palette or not displayed. An Across Dimension of Last Docked Window field 86 includes two sub-fields specifying the across dimension of a dockable window the last time it was docked to a horizontal dock and docked to a vertical dock. A Floating Window Size and Location field 88 specifies the dimensions of a dockable window the last time it was displayed upon the graphical user interface as a floating palette. The Window Title field 90 is a character string containing the title of a dockable window displayed in the title bar of the dockable window in the floating state. The Dock Worker data structure also contains a pointer to the Dock Manager 92 which facilitates returning to the Dock Manager data structure after reading or manipulating the contents of a Dock Worker data structure.

The illustrative embodiment of the present invention includes the capability of saving display state information for a dockable window when the dockable window is transformed to a hidden state. Thereafter, the hidden dockable window is restored to a display state in accordance with the saved display state information. In order to facilitate restoring a hidden dockable window to a previous display state, the dock worker for a dockable window includes a Dock Placement Information field 94.

Turning to FIG. 7, the sub-fields of the Dock Placement Information field 94 are presented. A Dock Position field 95 either specifies the dock (top, bottom, left or right) on which a hidden dockable window was previously displayed or specifies that the window was floating. Next, a Row Identification field 96 specifies a unique value identifying a row in the dock on which a hidden dockable window was previously displayed. The row identification values are sequential. Therefore proper relative positioning of a row on a dock is accomplished by comparing the value stored in the Row Identification field 96 for a hidden window to row identification values for existing rows on the dock.

The last three sub-fields of the Dock Placement field 94 concern the sizing and placement of a hidden dockable window when the hidden dockable window is restored to an identified dock row. A Position field 97 specifies the previous Along pixel position of the hidden dockable window in the identified row. An Along Dimension field 98 and an Across Dimension field 99 specify the previous dimensions of the hidden dockable window.

Turning now to FIG. 8, a schematic depiction is provided of a Dock element of the type pointed to by one of the array elements of the Dock Array 58. A Dock Position variable 100 specifies a side of the maximum work area of the parent application window with which the dock is associated (i.e., the top, bottom, right or left side). Next, an Along Dimension variable 102 identifies the length of a dock in the direction along the associated side of the maximum work area. A Row Count variable 104 specifies the current number of rows in a dock.

An array of Row Records 106 specifies information for positioning a row on an associated dock and displaying row major and row minor splitter bars within the row. Turning briefly to FIG. 9, each row record includes a Row Pixel Position field 108 which specifies the starting pixel position of a row on an associated dock. For horizontal docks, the Row Pixel Position field 108 specifies a horizontal line of the dock on which the row begins. For vertical docks, the Row Pixel Position field 108 contains a vertical line of the dock on which the row begins.

Next, a Row Identification field 110 specifies a number assigned to a row when the row was created on the dock. Thereafter, the value stored in the Row Identification field 110 is assigned to all windows docked on the row. As will be explained in greater detail below in conjunction with the description of the steps summarized in FIG. 23, if a docked window is thereafter hidden from view, and thus removed from the dock, the dock worker for the hidden docked window stores the row identification in the Row Identification field 96. When a user recalls the hidden docked window for display upon the dock, the window is replaced on the dock in accordance with the value stored in the Row Identification field 96 for the hidden docked window. If the row no longer exists on the dock when the window is recalled, then the row is recreated and inserted in a row position on the dock based upon the value of the Row identification field 110 in comparison to the values for the Row identification fields of the other currently displayed rows on the dock.

A Re-sizeable Windows Exist field 112 contains a boolean variable specifying whether the row includes a re-sizeable window. If the row includes a re-sizeable window, then a row major splitter is provided for the row. A Row Minor Counter field 114 specifies the number of row minor splitter bars which exist in the row, and a Row Minor Splitter array 116 specifies the pixel positions of the row minor splitter bars in the row.

The "top row" of a dock (also referred to as the "first row"), when used in the description of the illustrative embodiment of the invention, refers to a row in a horizontal dock nearest to the top of the display screen. In the case of a vertically oriented dock, the "top row" refers to the left-most row on the vertically oriented dock. Returning to FIG. 8, the Dock includes a Next Row ID variable 118 which specifies a value to be assigned to a next top row added to the Dock. When a row is added to the top of a dock, the value stored in the Next Row ID variable 118 is assigned to the row and the value in the Next Row ID variable 118 is decremented.

The "bottom row" of a dock, when used in the description of the illustrative embodiment of the invention, refers to a row in a horizontal dock nearest to the bottom of the display screen. In the case of a vertically oriented dock, the "bottom row" refers to the right-most row on the vertically oriented dock. The Dock also includes a Previous Row ID variable 120 which specifies a value to be assigned to a next bottom row added to the Dock. When a row is added to the bottom of a dock, the value stored in the Next Row ID variable 120 is assigned to the row and the value in the Next Row ID variable 120 is incremented.

In the illustrative embodiment of the present invention, a new row is not added at any position other than the "top" or the "bottom" by dragging and dropping a window. This row addition convention facilitates maintaining the relative position information of the rows of a dock by means of the Next Row ID variable 118 and the Previous Row ID variable 120.

The Dock schematically depicted in FIG. 8 also includes an Initialized variable 122 which is a boolean variable for indicating whether the dock is fully initialized, or in the process of being initialized. The Initialized variable 122 helps the application to determine where windows are positioned within a dock during and after initialization. The final field of the Dock contains a pointer to the Dock Manager 124 which facilitates returning to the Dock Manager data structure after reading or manipulating the contents of a Dock.

Each dockable window provides certain initialization information provided to the Dock Manager when the dockable window is created (i.e. a dock worker is generated for the dockable window). The fields of an initialization structure for a dockable window are schematically depicted in FIG. 10. A Window Identification 130 specifies a value to be loaded into the Dockable Window Identification 62 for a corresponding dock worker. A Window Caption 132 specifies a character string for the Window Title field 90 for the corresponding dock worker. The Flags 134 comprise a set of boolean values for loading into the Dockable to Horizontal Dock variable 66, Dockable to Vertical Dock 68, Position 70, Ask 72, Visible 74, Available 76, MDI 78, and Loading 80 boolean variables in the Dock Worker corresponding to the dockable window.

The initialization information includes a Dock Type 136 for providing dock type information for the Docktype 64 field in a corresponding Dock Worker for the dockable window. The initialization information also includes a Dock Position 138 specifying which, if any, of the four docks (top, bottom, left or right) to which the dockable window is initially associated. The "hidden" or "floating" position may also be specified. The position specified by the Dock Position 138 is loaded during initialization into the Dock Position field 84 of a corresponding Dock Worker for the dockable window. A Floating Window field 140 specifies the dimensions and position for a dockable window in the floating (palette) state loaded into the Floating Window Size and Location field 88.

Turning now to FIG. 11, another structure utilized by the illustrative embodiment of a display interface embodying the present invention is a Docked Window Information record. Docked Window Information records for dockable windows associated with a same dock are maintained in an Array of Dock Window Information (not shown) for the dock. The Array of Dock Window Information is a temporary data structure which facilitates the recalculation of a new dock state whenever the content or display state of the contents of a dock are modified in accordance with various user actions.

A Row Identification field 142 in a Docked Window Information record specifies the row identification for a row in a dock with which the docked window is associated. A Position field 144 specifies the Along pixel position of the docked window in the row identified in the Row Identification field 142. An Along Dimension field 146 and an Across Dimension field 148 specify the current dimensions of the docked window. Finally, a Window Pointer field 150 specifies the docked window for which the above described information is provided.

Having described the organization of the relevant information for carrying out the illustrative embodiment of the present invention, attention is now directed to the steps for manipulating the dockable windows. First, the steps are described for tracking the movement of a dockable window via a mouse controlled pointer drag and drop operation. Second, the steps are described for modifying a dock in response to a user adding, moving or removing a dockable window on a dock. Third, the steps for recalculating the content and positions of the contents of a dock row are described. Fourth, the steps are described for modifying the dimensions of the docks in response to a re-sizing of the windows of a dock. Fifth, the steps are described for modifying the sizes of docked windows via re-sizing bars. Sixth, the steps are described for restoring a window to the display of the graphical user interface from a hidden state.

Figure 12A:
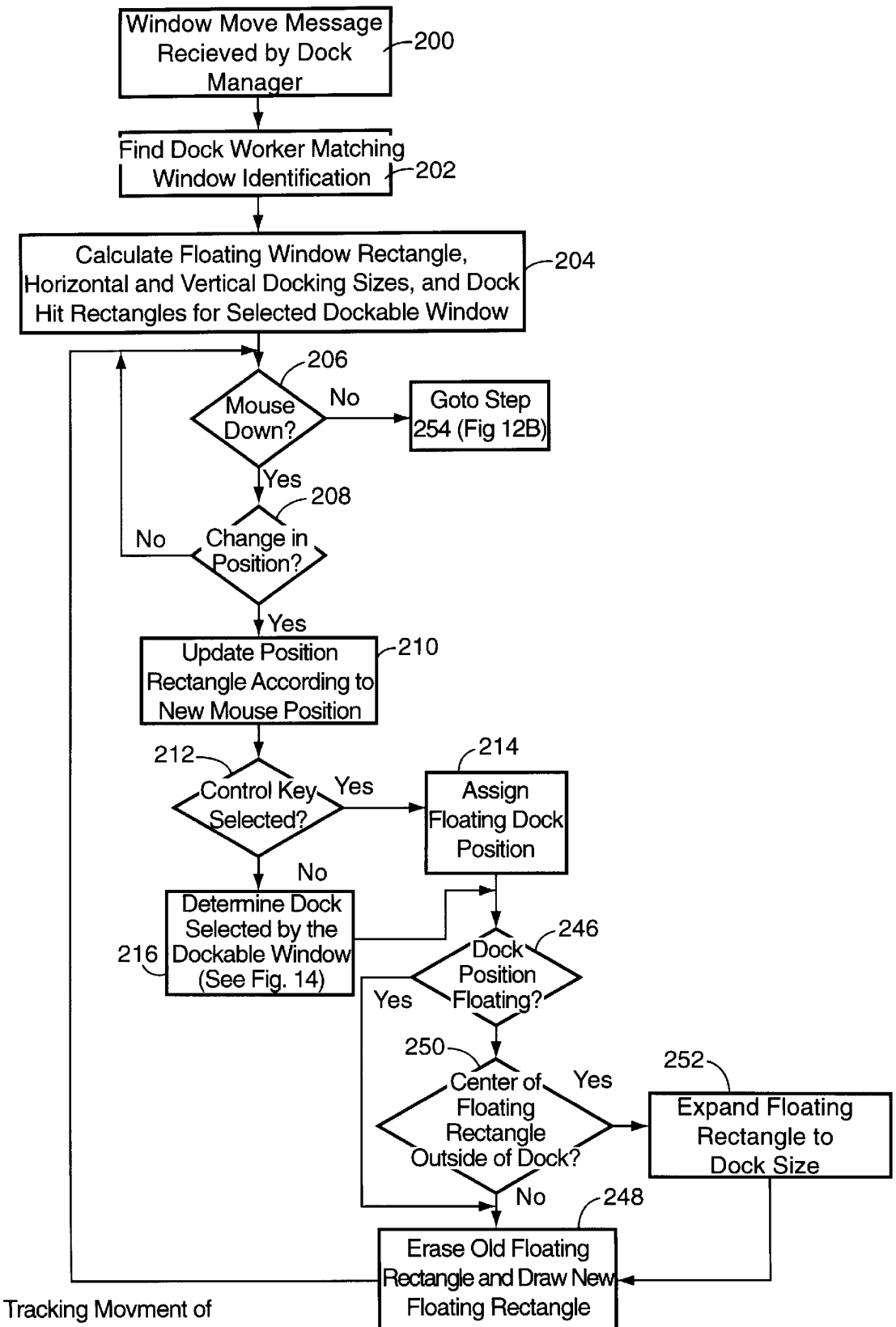
FIGS. 12A and 12B together comprise a flowchart summarizing the steps for tracking and executing the repositioning of a selected dockable window.

Turning now to FIG. 12A, at step 200, in response to a user depressing a mouse button while a display pointer is positioned over a selected dockable window, a window move message is received by the Dock Manager identifying the selected dockable window. Next at step 202 the Dock Manager searches the Pointer to Dockable Window field 60 of the Dock Workers until a matching Dock Worker is located for the selected dockable window. Control then passes to step 204 where the Dock Manager calculates an initial floating window rectangle for the selected dockable window. If the selected dockable window is currently floating, then the floating window rectangle is the same as the current dimensions of the selected dockable window. If the selected dockable window is not currently in a floating state and the Position variable 70 is TRUE, then the dimensions are obtained by reading the contents of the Floating Window Size and Location field 88 of the Dock Worker for the selected dockable window. If the Position variable 70 is FALSE, then the floating position and dimensions for the dockable window in the floating state are calculated from the current size and position of the dockable window.

Figure 13:
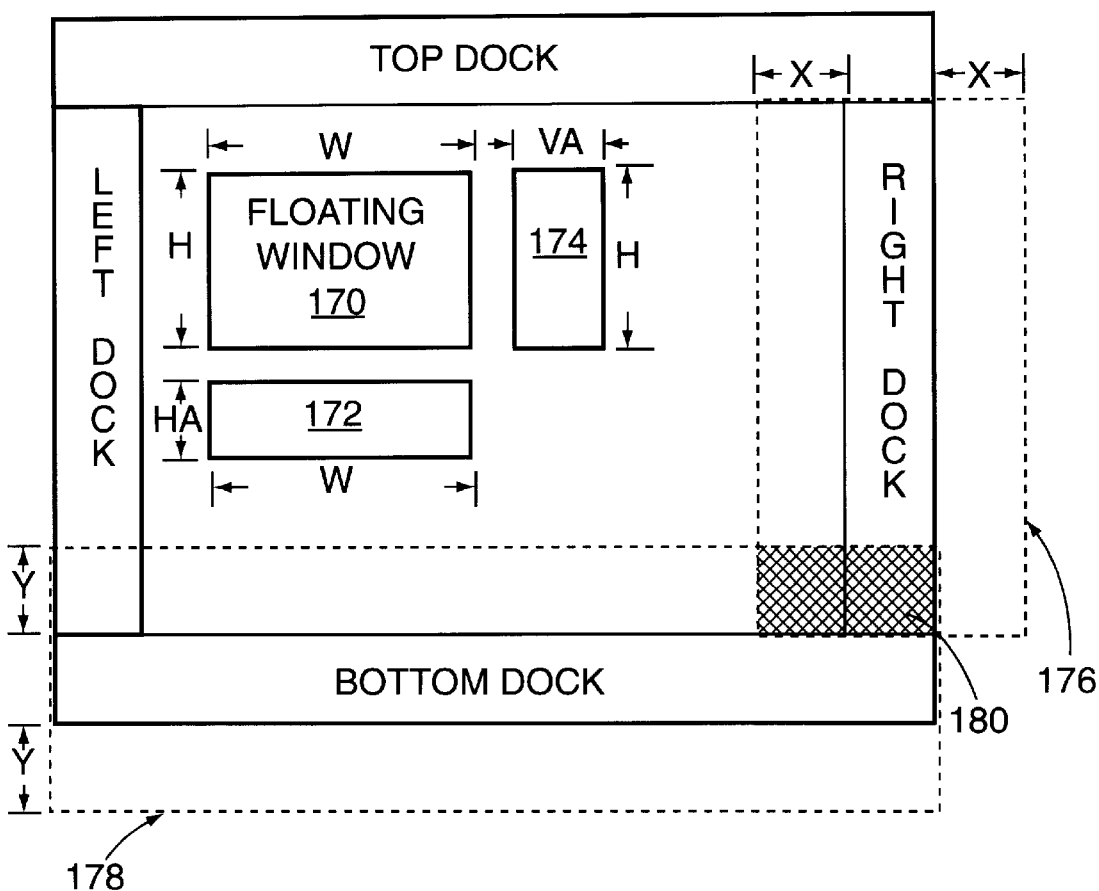
FIG. 13 is a schematic illustration of a parent application window, its associated docks, and two (of the four) hit rectangles associated with the docks.

Continuing with the description of step 204, the docking sizes are calculated for the selected dockable Floating Window 170. Turning to FIG. 13, a horizontal docking rectangle 172 for docking the Floating Window 170 to a horizontal dock (i.e. the Top Dock or the Bottom Dock) is obtained by taking the current width W of the Floating Window 170 and an across dimension HA for horizontal docking from the Across Dimension of Last Docked Window field 86. A vertical docking rectangle 174 for docking the Floating Window 170 to a vertical dock (i.e., the Left Dock or the Right Dock) is obtained by taking the current height H of the Floating Window 170 and an across dimension VA for vertical docking from the Across Dimension of Last Docked Window field 86.

Dock hit rectangles must be calculated for each dock on the parent application window in order to determine to which dock a selected dockable window is to be docked. Continuing with the description of step 204 and with continued reference to FIG. 13, after calculating the docked window sizes for the selected dockable window, a dock hit rectangle is calculated for each of the four docks associated with the parent application window. A dock hit rectangle is calculated for each dock by taking the current size and position for the dock and then extending the across dimension of the dock by adding a row on each of the two adjacent sides of the dock. Dashed outlines schematically depict a right dock hit rectangle 176 and a bottom dock hit rectangle 178. The outlines for the Top Dock and Left Dock hit rectangles are not provided in FIG. 13 in order to avoid cluttering the illustration. However, their dimensions would be known in view of the general description of their dimensions described above, and in view of the illustrated dock hit rectangles 176 and 178 for the Right Dock and Bottom Dock.

It has been stated above that a dock hit rectangle is constructed by adding a row to each side of a current dock. The across dimension of each of the added rows equals the across dimension of last docked window which was previously determined in the window docking size calculation portion of step 204. Therefore, the width X of the left and right expansion rows when calculating a dock hit rectangle 176 for the Right Dock equals VA. The height Y of the top and bottom expansion rows when calculating a dock hit rectangle 178 for the Bottom Dock equals HA.

Next, at step 206, the mouse tracking loop begins with a test for determining whether a mouse button up signal has been sensed by the computer. At step 206, if the mouse button has not been released, then control passes to step 208 and the current position of the mouse controlled display pointer is checked against the previous mouse position in order to determine whether the mouse controlled display pointer has been moved on the display screen. If the display pointer has not changed position, then control passes back to step 206. If however, the display pointer has moved, then control passes to step 210 and the position of the floating rectangle for the selected dockable window is recalculated in a known manner in accordance with the new display pointer position. Control then passes to step 212.

At step 212, the state of the control key is checked to see whether the user has depressed the control key or other suitable over-ride signal has been received to prevent docking of the selected dockable window. If the control key is down, then control passes to step 214 and the rectangle is assigned a floating dock position value. Control then passes to step 246.

If however, at step 212 the control key is not down, then control passes to step 216 where it is determined whether the selected dockable window has been moved within a hit rectangle for any of the docks and the proper dock to which the selected window will dock in the event that the user releases the mouse button. The sub-steps associated with dock determination step 216 are depicted in FIG. 14.

Figure 14:
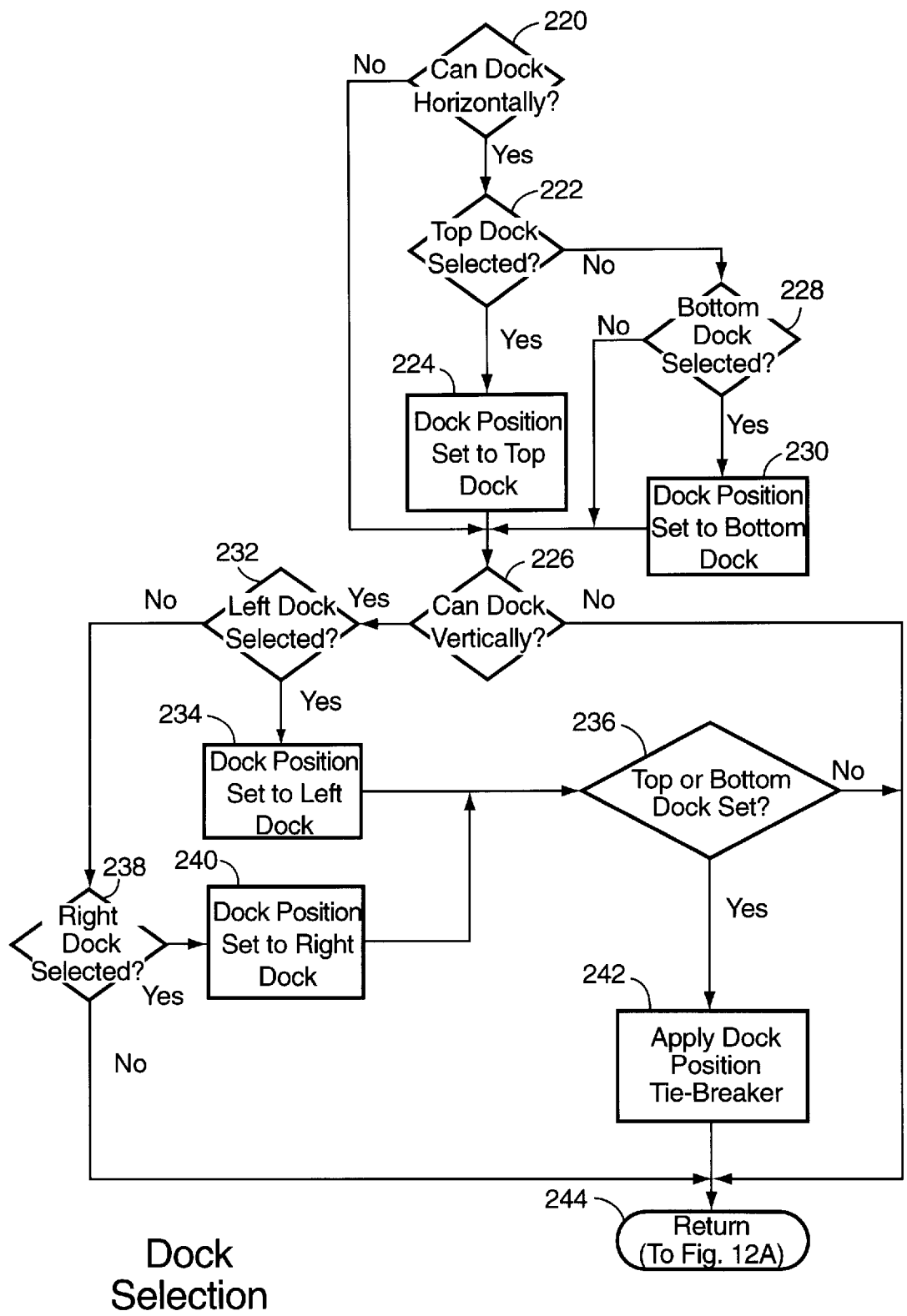
FIG. 14 is a flowchart summarizing the steps for dock selection during tracking of the movement of a dockable window.

Turning briefly to FIG. 14, at step 220 it is determined whether the selected dockable window can dock to one of the horizontal docks by reading the Dockable to Horizontal Dock field 66 of the dock worker for the selected dockable window. If the selected dockable window cannot dock to a horizontal dock, then control passes to step 226. However, if the selected dockable window is capable of docking to one of the horizontal docks, then control passes to step 222. At step 222, if the floating rectangle image of the selected dockable window overlaps the hit rectangle for the top dock and the display pointer is within the top dock hit rectangle, then control passes to step 224 where the dock position for the selected dockable window is provisionally set to the top dock. In addition, at step 224, a value is stored corresponding to the distance between the horizontal center line of the floating rectangle of the selected dockable window and the horizontal center line of the top dock. Control then passes to step 226. Otherwise, control passes from the top dock hit rectangle test at step 222 to step 228.

At step 228, if the floating rectangle image of the selected dockable window overlaps the hit rectangle for the bottom dock and the display pointer is within the bottom dock hit rectangle, then control passes to step 230 where the dock position for the selected dockable window is provisionally set to the bottom dock. In addition, at step 230, a value is stored corresponding to the distance between the horizontal center line of the floating rectangle of the selected dockable window and the horizontal center line of the bottom dock. Control then passes to step 226. Otherwise, control passes from the bottom dock hit rectangle test at step 228 to step 226.

At step 226 it is determined whether the selected dockable window can dock to one of the vertical docks by reading the Dockable to Vertical Dock field 68 of the dock worker for the selected dockable window. If the selected dockable window is not capable of docking to one of the vertical docks, then control passes to a Return step 244. If the selected dockable window is capable of docking to one of the vertical docks, then control passes to step 232. At step 232, if the floating rectangle image of the selected dockable window overlaps the hit rectangle for the left dock and the display pointer is within the left dock hit rectangle, then control passes to step 234 where the dock position for the selected dockable window is provisionally set to the left dock. In addition, at step 234 a value is stored corresponding to the distance between the vertical center line of the floating rectangle of the selected dockable window and the vertical center line of the left dock. Control then passes to step 236. Otherwise, control passes from the left dock hit rectangle test at step 232 to step 238.

At step 238, if the floating rectangle image of the selected dockable window overlaps the hit rectangle for the right dock and the display pointer is within the right dock hit rectangle, then control passes to step 240 where the dock position for the selected dockable window is provisionally set to the right dock. In addition, at step 240, a value is stored corresponding to the distance between the vertical center line of the floating rectangle of the selected dockable window and the vertical center line of the right dock. Control then passes to step 236. Otherwise, control passes from the bottom dock hit rectangle test at step 238 to the Return step 244.

When the dock hit rectangles are calculated during step 204 described above, the vertical and horizontal dock hit rectangles overlap in the four corners of the parent application windows. This is shown, for example by the cross-hatched rectangular region 180 in the bottom right corner of the illustration in FIG. 13 of two of the four dock hit rectangles. As a result, it is possible to position the pointer and floating rectangle in a position where the floating rectangle will be provisionally assigned to both a horizontal and a vertical dock. In the illustrative embodiment of the present invention, a tie-breaker is implemented to determine a single, final dock selection from the two provisional dock selections.

Continuing with the description of FIG. 12, if the dock position was provisionally set to either the left dock or the right dock position during steps 234 or 240, then at step 236 it is determined whether the dock position was provisionally set to either the top dock or the bottom dock position previously during steps 224 or 230 (i.e. whether two docks have been provisionally assigned to the floating rectangle). If neither the top dock nor bottom dock positions were provisionally set, then application of a tie-breaker is not necessary and control passes to the Return step 244. However, if at step 236, it is determined that the dock position was also provisionally set to either the top dock or the bottom dock, then control passes to step 242.

At step 242, a tie-breaker is applied in order to assign a final dock position to the selected dockable window from two provisionally selected adjacent docks (one horizontal, one vertical). In the illustrative embodiment of the present invention, the final selection of a dock position is achieved by comparing the distances between center lines calculated and stored when the floating rectangle for the selected dockable window was provisionally assigned each of the two dock positions. The final dock position assigned to the floating rectangle is the dock having the smaller calculated distance between center lines. Control then passes to the Return step 244.

Returning to FIG. 12A, after assigning a dock position (top, bottom, right, left, or floating) in step 216, control passes to step 246. If the floating rectangle for the selected dockable window has been assigned the floating dock position, then control passes to step 248. If the floating rectangle has not been assigned to the floating dock position, then control passes to step 250.

In the illustrative embodiment of the present invention, means are incorporated for providing visual feedback to a user regarding where a selected dockable window will dock and the initial dimensions which will be designated for the selected dockable window after the user drops the selected dockable window. If the center line of the floating rectangle is outside the dock determined in step 216, then a new row is created in the dock and the selected dockable window, if re-sizeable, will expand to occupy the entire new row after the user drops the selected dockable window.

In view of the above, at step 250, if the center of the floating rectangle is outside the perimeter of the dock specified in the selected dockable window's dock position field 84, then control passes to step 252, and the floating rectangle for the selected dockable window is modified by stretching the along dimension of the floating rectangle to the entire length of the dock if the dockable window is re-sizeable. The across dimension of the floating rectangle is equal to the across dimension specified by the appropriate one of the two across dimensions (for horizontal/vertical docking) specified in the Across Dimension of Last Docked Window field 86. Control then passes to step 248.

If at step 250 the center of the floating rectangle is inside the dock perimeter then control passes to step 248, and the dockable window will be added (if dropped) to one of the presently existing rows, the along dimension of the floating rectangle is not modified and no new rows are added to the dock. At step 248, the former displayed floating rectangle is removed from the display interface and a new floating rectangle is drawn for the selected dockable window. Control then passes to step 206. If, at step 206 the mouse button is not down, then control passes to step 254 (FIG. 12B).

Figure 12B:
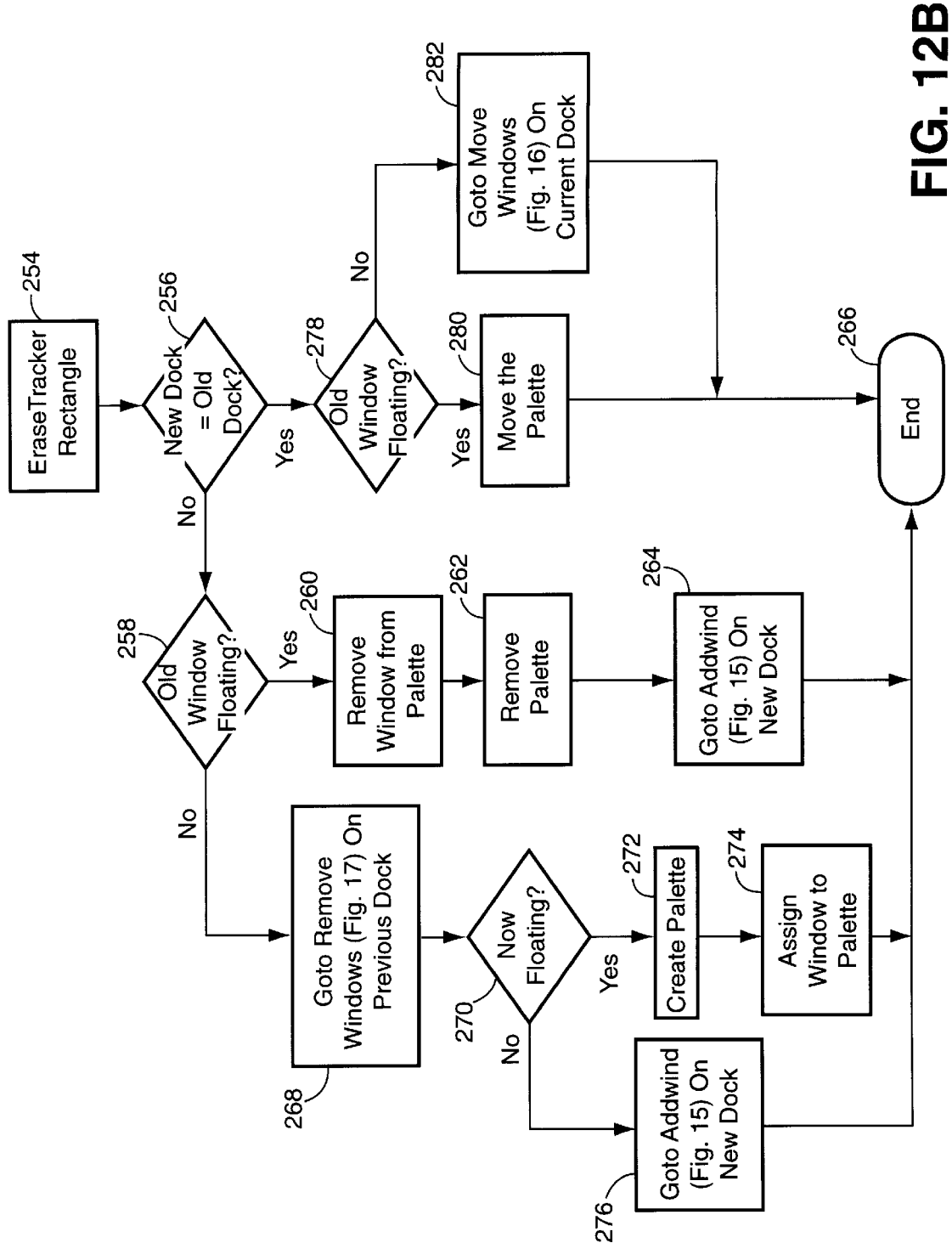

Turning now to FIG. 12B, step 254 marks the commencement of the stage of operation of the display interface where the displayed windows are updated to incorporate a modified position of a moved dockable window. At step 254 the floating rectangle for the selected dockable window is removed from the display screen. Control passes to step 256.

At step 256, if the current dock position is not the same as the old dock position, then control passes to step 258. If, at step 258 the old dock position for the selected dockable window was floating, then control passes to step 260 where the steps are commenced for removing a dockable window from a floating palette display state and associating the dockable window with one of the docks.

Figure 15:
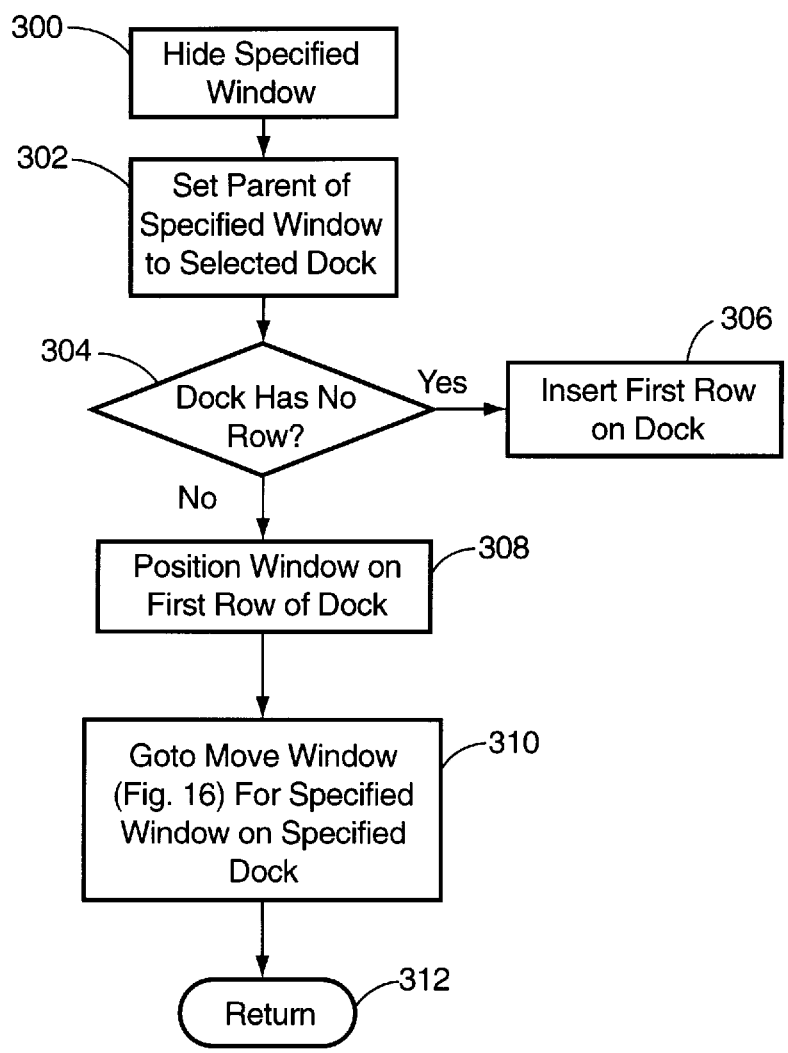
FIG. 15 is a flowchart summarizing the steps for adding a dockable window to a dock.

At step 260, the selected window is removed from the palette view by redesignating the floating dock position specified in the Dock Position field 84 of the dock worker for the selected dockable window. Other steps, known to those skilled in the art are performed to complete the disassociation of the selected dockable window from the palette view. Next, at step 262, the palette view of the selected dockable window is removed from the display in a known manner. Control then passes to step 264 and the steps are performed for adding and positioning the selected dockable window upon a dock designated during step 216. The steps for adding and positioning a window upon a designated dock are illustrated in FIG. 15 (described below). Control then passes to an End step 266.

Figure 17:
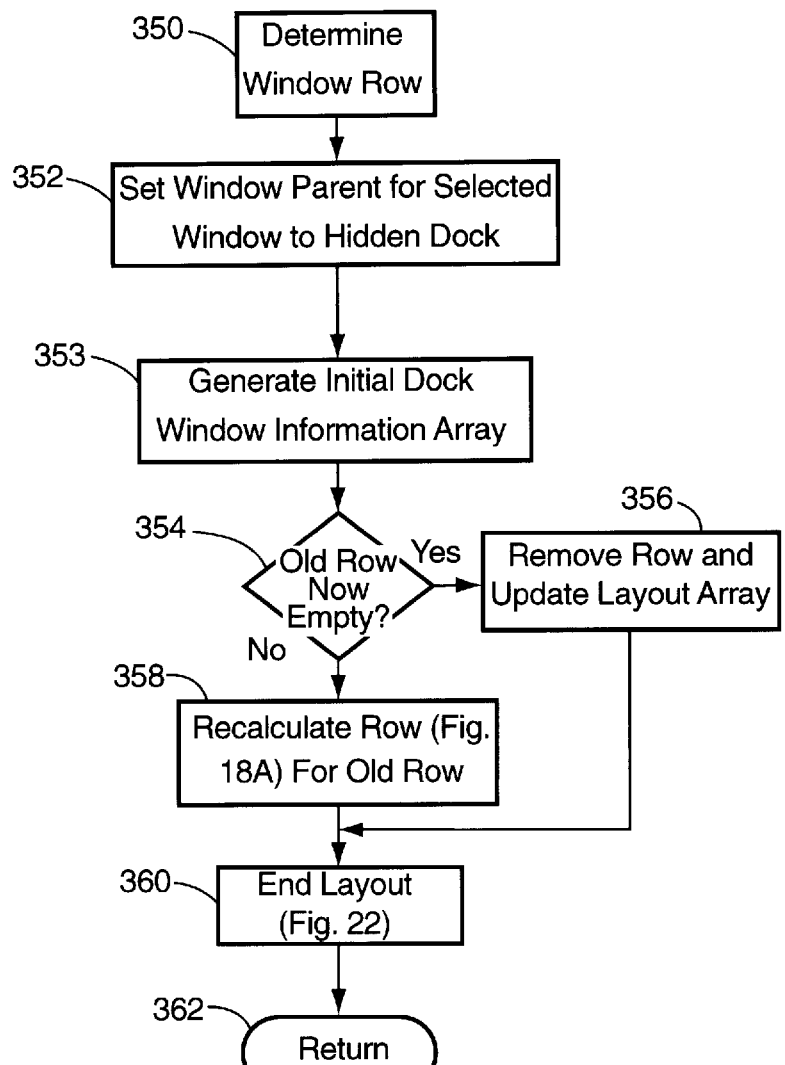
FIG. 17 is a flowchart summarizing the steps for removing a docked window from a dock.

If however, at step 258, the old dock position for the selected dockable window was not floating, then control passes to step 268 and steps are performed for removing the selected dockable window from the old dock. The steps for removing (disassociating) a window from a dock are illustrated in FIG. 17 described below. After removing the selected dockable window from the old dock, control passes to step 270.

If the current dock position of the selected dockable window is the floating position (i.e. not associated with any of the docks), then control passes from step 270 to step 272. Procedures known to those skilled in the art of graphical user interfaces are performed to create a palette to accommodate the selected dockable window. The dimensions of the palette are specified in the Floating Window size and Location field 88 in the dock worker for the selected window. Control then passes to step 274 where the selected dockable window is assigned to the palette by designating a floating dock position in the Dock Position field 84 of the dock worker for the selected dockable window and performing other well known operations for assigning a window to a designated palette. Control then passes to the End step 266.

If, at step 270, the current dock position of the selected dockable window is a dock (the user has moved the selected dockable window from a first dock to a second dock), then control passes to step 276. At step 276 operations are performed for adding and positioning the selected dockable window upon a new dock designated during step 216. The steps for adding and positioning a window upon a designated dock are illustrated in FIG. 15 (described below). Control then passes to the End step 266.

Returning to the top of the flow chart and in particular step 256, if the new dock position is the same as the old dock position, then control passes to step 278. If, at step 278, the old dock position designation is "floating", then control passes to step 280 and the palette corresponding to the selected dockable window is moved on the display screen to a new designated floating position. Control then passes to the End step 266.

Figure 16:
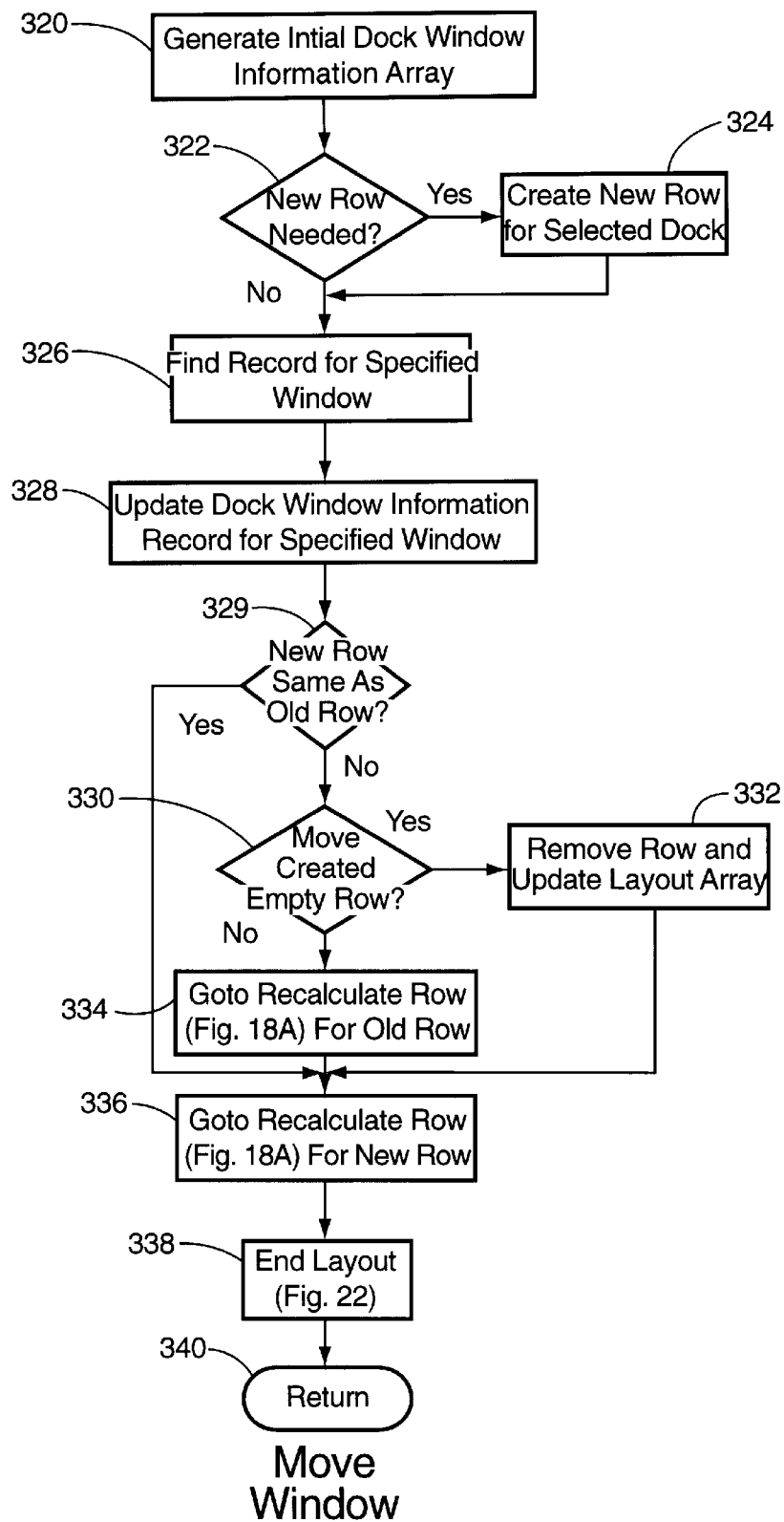
FIG. 16 is a flowchart summarizing the steps for repositioning a dockable window within a dock.

However, if at step 278, the old dock position designation for the selected dockable window is one of the docks, then control passes to step 282. At step 282, operations are performed for moving the selected dockable window to a new position on a same dock designated during step 216. The steps for moving a docked window on a dock are illustrated in FIG. 16 (described below). Control then passes to the End step 266.

Turning now to FIG. 15, the steps are summarized for adding a specified dockable window, having a designated rectangle corresponding to its docking rectangle (calculated during step 204), to a specified dock. The specified dockable window is initially placed in the first row of the specified dock. The first row is the same as the top row on a dock and these two terms are used interchangeably in the detailed description of the drawings. The specified window is placed in the correct row (at step 310) by executing a move operation on the specified window.

At step 300 the graphical user interface hides the specified dockable window. This prevents the "WINDOWS" (TM) operating system from modifying the display state of the specified window while the specified window is being added to the specified dock. Next, at step 302, the specified dock is identified to the "WINDOWS" (TM) Operating System as the parent of the specified dockable window. Control then passes to step 304.

At step 304, if the specified dock currently has no rows, then control passes to step 306 and a first (top) row is added to the specified dock. The values for the fields of a Row Record for the new row on the specified dock, illustrated in FIG. 9 are initialized in accordance with a set of display characteristics associated with the specified dockable window. After inserting a new first row on a dock during step 306, control passes to step 308. If it is determined, at step 304, that the specified dock already contains a first row, then control passes directly from step 304 to step 308.

At step 308, the specified dockable window is assigned a screen position in the "WINDOWS" (TM) operating system corresponding to the first row of the specified dock. However, the position to which the specified dockable window should be moved in order to add the specified dockable window to a proper position on a proper row of the specified dock is saved. Control then passes to step 310.

At step 310 a set of operations are performed for moving the specified dockable window from the first row of the dock to a proper position on the specified dock. This is accomplished by making a procedure call for moving a window on a same dock and identifying the specified dockable window and the window rectangle corresponding to the proper position of the specified dockable window on the specified dock. The steps for moving a specified dockable window on a dock are summarized in FIG. 16 (described below). Control then passes to the Return step 312.

Turning now to FIG. 16, the steps are illustrated for assigning a specified docked window to a row, updating the array of rows for a specified dock, recalculating the size and positions of the docked windows and dock rows in a dock, and updating the entire parent application window in response to the repositioning of the specified docked window within the dock. The repositioning of the specified docked window is executed in accordance with a new position designated for the specified docked window on the dock.

At step 320 an array of dock window information is constructed. The array of dock window information comprises records representing each docked window currently designating the specified dock including the specified docked window. Each record in the array of dock window information comprises the information summarized in FIG. 11 (described above) and is calculated from (1) dimensions and location of a docked window provided by the "WINDOWS" (TM) Operating System, and (2) dock row position information provided by the specified dock. A window is assigned to a row of a dock in which the window's top edge (or left edge in the case of vertical docks) lies. Control then passes to step 322.

At step 322, if creation of a new row in the specified dock is required (i.e., the top/left edge of a window rectangle associated with a horizontal/vertical dock lies outside the specified dock), then control passes to step 324 where a new row is added to the dock structure (FIG. 8). A row record comprising the fields displayed in FIG. 9 is created, and the values of the fields are initialized in accordance with a set of display characteristics associated with the specified docked window and the row pixel position information of other windows on the dock (if the row is added below another row on the dock data structure). If rows exist below the added row in the dock data structure, then the values stored in the Pixel Position of Row field 108 are adjusted in each of the lower rows in accordance with the increased width of the dock.

The Row Identification field 110 of the row record for the new row is assigned the contents of either the Next Row ID variable 118 or the Previous Row ID variable 120 depending upon the position of the added row. The Next Row ID variable or the Previous Row ID variable is then updated with a next value. The new row record is added to the Array of Row Records 106. The Row Count field 104 is incremented.

After adding a new row on a dock during step 324, control passes to step 326 and the information record corresponding to the specified docked window is located. If at step 322 no new row is needed, then control passes directly to step 326. At step 326, the Window Pointer field 150 is read in the array of dock window information for the specified dock until the specified dock window is found. Control then passes to step 328.

At step 328 the dock window information record for the specified docked window is updated. Updating the record for the specified docked window comprises calculating a proper row in which to insert the specified window. The dock row loaded into the Row Identification field 142 for the specified docked window is calculated by determining the dock row in which the top/left edge of the window rectangle for the specified docked window falls in the horizontal/vertical specified dock. In addition, the starting positions for docked windows within rows are inserted into the Position field 144 for each docked window. For horizontal docks, the left side of the specified docked window is loaded into the Position field 144 (in vertical docks, the top edge is loaded). The along and across dimensions for the specified window are loaded into the Along field 146 and the Across field 148 respectively. The window identification for the specified window is copied into the Window Pointer field 150. Control then passes to step 329.

At step 329, it is determined, by comparing the row identifications for the new and old rows, whether the new row to which the window is to be moved is the same as the old row from which it has been moved (i.e., the docked window is merely being re-positioned in a same row). If the new row identification is not the same as the old row identification, then control passes to step 330. Otherwise control passes to step 336.

The moving of the specified docked window may create an empty row in the dock. If, at step 330, the moving of the specified dockable window created an empty row in the specified dock, then control passes to step 332 where operations are performed to remove the empty row from the Array of Row Records 106 for the specified dock. The Pixel Position of Row field 108 is adjusted for any of affected remaining rows on the specified dock to reflect the removal of the row on the specified dock. Control then passes to step 336.

If, at step 330, the specified dockable window did not create an empty row in the specified dock, then control passes to step 334. At step 334 the size and position of the remaining docked windows on the row of the specified dock from which the specified dockable window was moved are recalculated and the number, size and/or positions of the re-sizing splitter bars are adjusted in accordance with the modifications to the docked windows remaining in the former row of the specified dockable window. The steps for updating the content and appearance of the row are summarized in FIGS. 18A, 18B (described below). Control then passes to step 336.

At step 336 the size and position of the docked windows on the row of the specified dock to which the specified dockable window was moved are recalculated and the number, size and/or positions of the re-sizing splitter bars are adjusted in accordance with the modifications to the docked windows remaining in the former row of the specified dockable window. The steps for updating the content and appearance of the row are summarized in FIGS. 18A, 18B (described below). Control then passes to step 338.

At step 338, the dock workers for the windows on the specified dock containing the selected row are updated in accordance with the contents of the dock window information array for the specified dock. In addition, the graphical user interface is redrawn in accordance with the contents of the dock window information array for the specified dock. These steps are summarized in FIG. 22 (described below). Control then passes to Return step 340.

Turning now to FIG. 17, the steps are summarized for removing a specified docked window from a specified dock. At step 350, it is determined from which row the specified docked window is to be removed based upon a rectangle position of the specified docked window provided by the "WINDOWS" (TM) operating system and the row positions supplied by the Row Pixel Position field 108 associated with each of the rows of a dock to which the dockable window is to be removed.

Next, at step 352 the specified docked window parent is set to the "Hidden" dock position which causes the docked window to be removed from the display when the graphical display is updated and repainted. Control passes to step 353 where an array of dock window information is generated for the specified dock in the same manner described in step 320. Control then passes to step 354.

Removing the specified docked window may create an empty row in the dock. This is observed by reading the Row Identification field 142 in each record of the array of dock window information for the selected dock generated during step 353. If none of the remaining windows of the dock specify the row identification contained in the Row Identification field 142 of the removed window, then the row is empty. If, at step 354, it is determined that removing the specified docked window creates an empty row in the specified dock, then control passes to step 356 where the Row Record corresponding to the empty row is removed from the Array of Row Records 106 for the specified dock. The beginning positions for any remaining rows on the specified dock affected by the removal of the row are updated as well to reflect the removal of the empty row on the specified dock. Control then passes to step 360.

If, at step 354, the specified docked window did not create an empty row in the specified dock, then control passes to step 358. At step 358 the size and position of the remaining docked windows on the row of the specified dock from which the specified docked window was moved are recalculated and the number, size and/or positions of the re-sizing splitter bars are adjusted in accordance with the modifications to the docked windows remaining in the former row of the specified docked window. The steps for updating the content and appearance of the row are summarized in FIGS. 18A, 18B (described below). Control then passes to step 360.

At step 360 the graphical user interface display is updated to reflect the changes in the display resulting from the removing of the specified docked window. At step 360, the dock workers for the windows on the specified dock containing the selected row are updated in accordance with the contents of the dock window information array for the specified dock. In addition, the graphical user interface is redrawn in accordance with the contents of the dock window information array for the specified dock. These steps are summarized in FIG. 22 (described below). Control then passes to Return step 362.

Figure 18A:
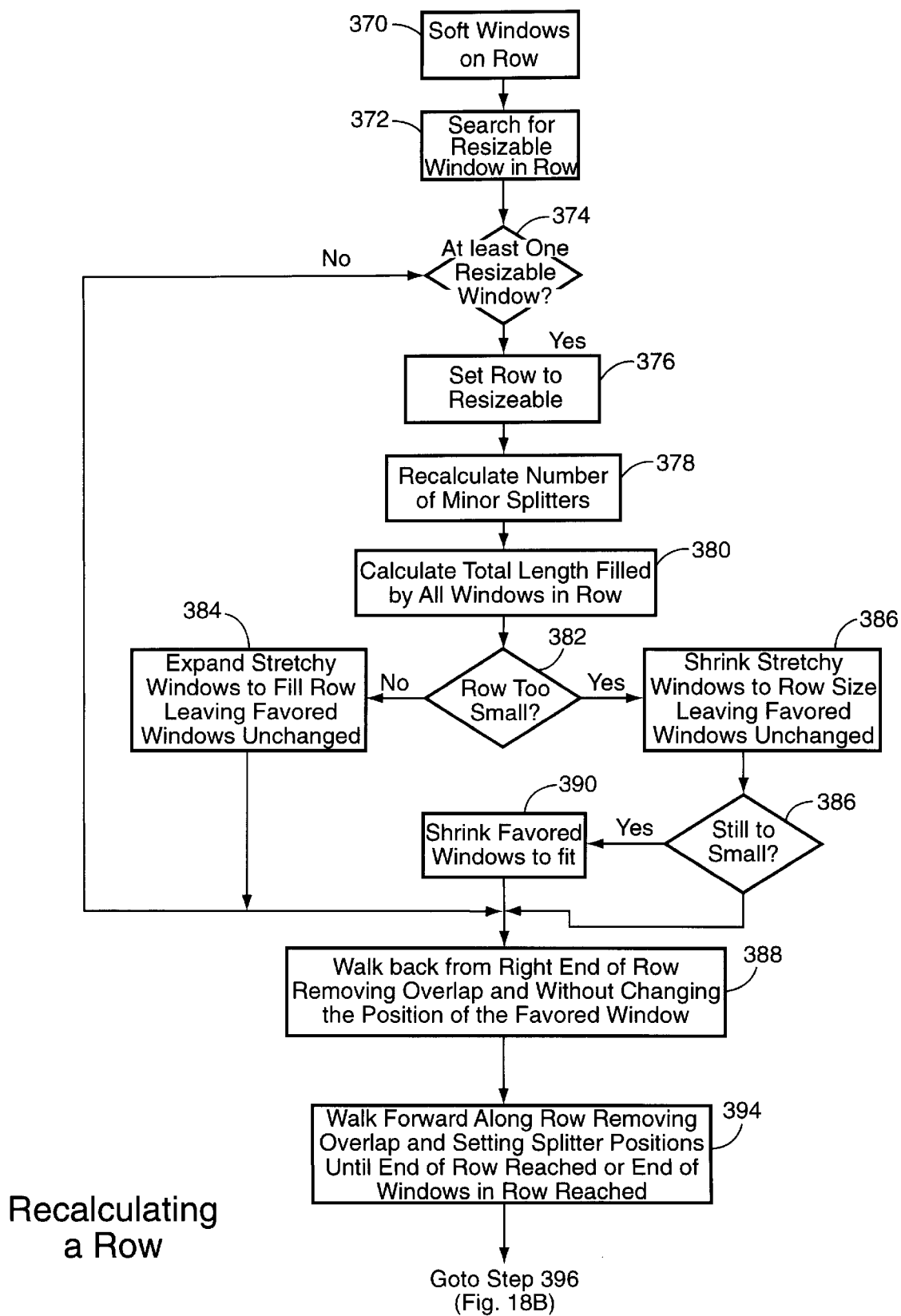
FIGS. 18A and 18B together comprise a flowchart summarizing the steps for recalculating the positions of windows and row splitter bars on a row in accordance with supplied information including a specified row and an array of dock window information including docked window information for the row.
Figure 18B:
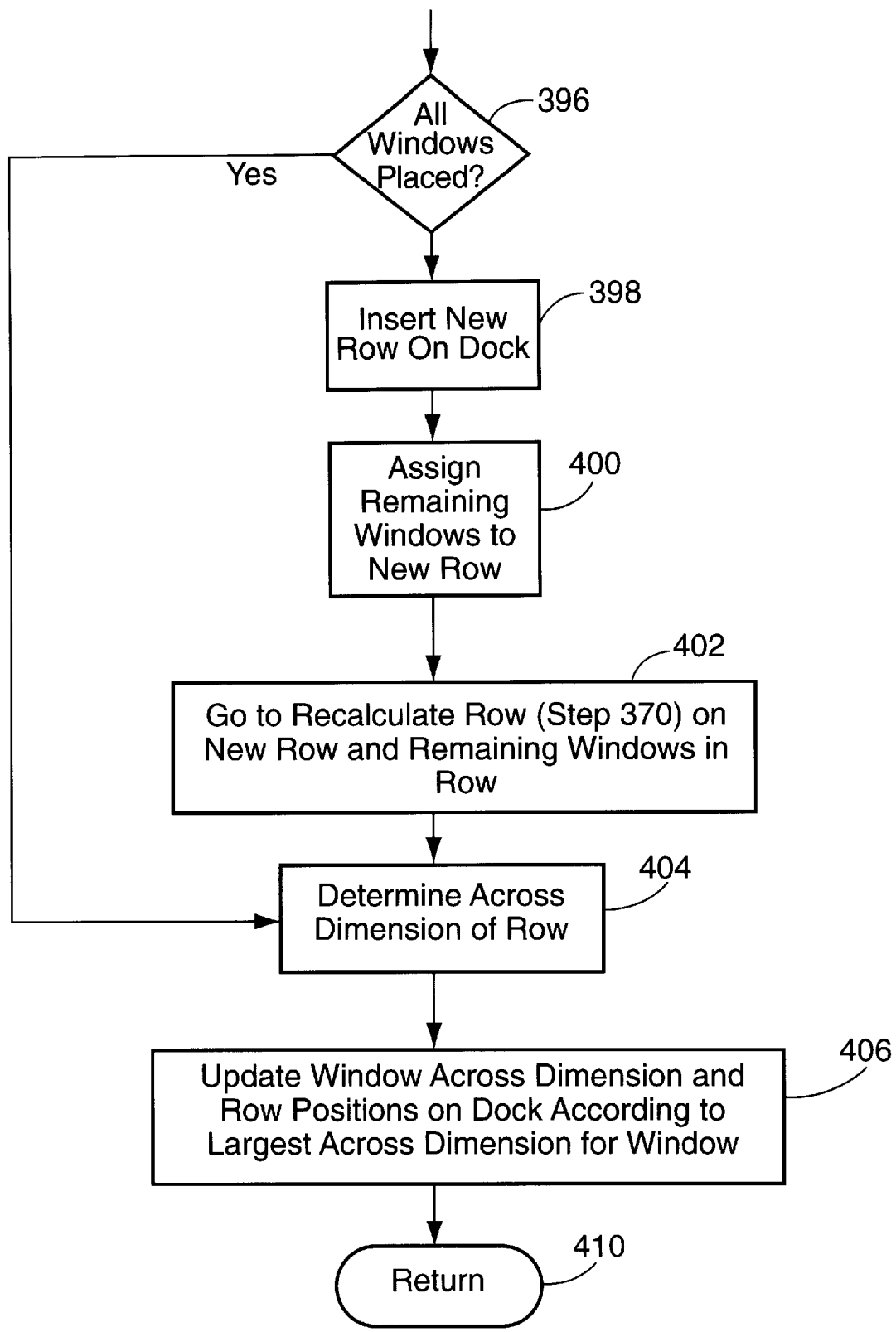

Turning now to FIGS. 18A and 18B, the steps are summarized for recalculating the content and appearance of a specified row in a dock when a dockable window is moved within, added to, or removed from the specified row; or when the along dimension of the specified row is altered. In addition to the specified row, an array of dock window information for the dock containing the specified row is provided. A favored window may also be specified. The favored window is the selected dockable window which was tracked during the tracking steps summarized in FIG. 12A. In calculating the sizes and positions of the windows on the specified row, the positioning and sizing procedures attempt to maintain the provided along dimension of the favored window as well as the relative position of the favored window.

At step 370, the windows on the specified row are generally sorted according to the left edges of the windows in the case of horizontal dock rows (top edge for vertical dock rows). An exception to this general rule occurs when the comparison involves a favored window in a row. If the favored window has a larger across dimension than a compared docked window, then relative positions of the favored window and the compared docked window are assigned according to the current positions of the left edges of the favored window and the compared docked window. The window, of the two compared windows, having a left edge farthest to the left is assigned the relative left position with respect to the two windows during sorting of the windows on the row.

If the favored window has a smaller across dimension than the compared docked window, then relative positions of the favored window and the compared docked window are assigned according to the current positions of the mid-points of the favored window and the identified docked window. The window having a mid-point farthest to the left is assigned the relative left position with respect to the two windows during sorting of the windows on the row.

It is noted that the above discussion addresses sorting in horizontal docks. The sorting procedure for windows on a vertical dock is accomplished in a similar manner. However, in the case of vertical docks, the top edge position of windows are compared instead of the left position of the windows when sorting the windows on a row.

After sorting the windows on the specified row in step 370, control passes to step 372 and the array of dock window information for the dock containing the specified row is searched in order to determine whether the specified row contains at least one re-sizeable window. Control then passes to step 374.

If, at step 374, the specified row does not have any re-sizeable windows, then control passes to step 392. However, if the specified row contains at least one re-sizeable window, then control passes to step 376. At step 376, the Re-sizeable Windows Exist field 112 for the specified row is set to true to indicate that a row major splitter should be provided for the specified row. Next, at step 378, the row minor splitter bars are recalculated for the row. A row minor splitter bar is positioned between two windows in a row if:

a. At least one of the two windows adjacent the row minor splitter bar will be a re-sizeable window, and b. A re-sizeable window will be present on the row on both sides of the row minor splitter bar after the row minor splitter bar is inserted between the two windows (the resizeable window need not be adjacent the row minor splitter bar).

Thereafter, the widths of row minor splitters are taken into account in all calculations of the total along length occupied by docked windows and splitters on a dock row.

After determining the row minor splitter bars in step 378, control passes to step 380 where the along dimension values of the windows (obtained from the Along dimension field 146 in the dock window information records) in the specified row are combined to obtain a total along length. Next, at step 382, the total along length is compared to the length of the dock (obtained from the Along Dimension field 102 for the dock containing the specified row). If the total along length is less than or equal to the length of the dock, then control passes to step 384.

At step 384, all re-sizeable windows in the specified row, other than the favored window, capable of re-sizing in the along dimension are proportionally expanded by a same scaling factor so that the scaled total along length is equal to the length of the dock. If the favored window is the only re-sizeable window in the row, then the favored window is expanded so that the total along length is equal to the length of the dock. Control then passes to step 392.

If, at step 382, the total along length of the windows is greater than the length of the dock, then control passes to step 386. At step 386, all re-sizeable windows in the specified row, other than the favored window, capable of re-sizing in the along dimension are proportionally reduced by a same scaling factor in order to obtain a scaled total along length equal to the length of the dock. Control then passes to step 388.

If, at step 388, the scaled total along length of the windows is still greater than the dock length, even after reducing all other re-sizeable windows to a minimum along dimension, then control passes to step 390 and an attempt is made to fit the windows within the along dimension of the row by reducing the along dimension of the favored window. Control then passes to step 392. If, at step 388, the scaled total along length of the windows does not exceed the length of the specified dock, then control passes to step 392.

At step 392, layout begins of the windows within the row by placing the windows side by side on the row beginning with the right-most window and walking back to the left until the favored window is reached. When the favored window is reached, the position of the favored window is maintained (rather than attempting to place the window adjacent the left edge of the immediately preceding window sorted relatively to the right of the favored window). Placing of the windows on the row continues with the placement of the next window (sorted immediately relatively to the left of the favored window) adjacent the favored window next to the left edge of the favored window. The placing of the windows continues from right to left, and the remaining windows in the row are placed side by side on the row until all the windows have been placed end to end. Control then passes to step 394.

At step 394, the placing of windows continues by starting at the left end of the row and walking to the right on the specified row beginning with the placing of the left-most window on the specified row adjacent the left edge of the dock row. Overlap is removed from the windows on the row, and row minor splitter bars are inserted where appropriate in accordance with the calculations performed during step 378. Placing of the windows and splitter bars in the row progresses until either all of the windows have been placed in the row or the space is exhausted in the specified row for placing the windows within the specified row. Control then passes to FIG. 18B and step 396.

At step 396, if all of the windows in the row have been placed, then control passes to step 404. If however, at step 396, the space in the specified row is exhausted and at least one of the windows in the row is completely outside the row, then control passes to step 398. At step 398, a new row is added just below (or to the right if in a vertically oriented dock) of the current row. The new row holds the remaining windows for the specified row that could not be placed upon the specified row during step 394. A Row Record is created for the new row and a value from the Next Row ID variable 118 for the dock is assigned to the Row Identification field 110 of the new row. Control then passes to step 400.

At step 400, the Row Identification field 142 is modified in the dock window information records for each of the remaining windows in the specified row to designate the added row. Control then passes to step 402 and the content and position of the added row is calculated by making a recursive jump to step 370 and specifying the current dock window information array. The designated row for the recursive jump to step 370 is the added row.

At step 404, the window having a largest across dimension in the specified row is determined. Thereafter, at step 406, the Across Dimension field 148 for each re-sizeable window docked on the specified row is loaded with the largest across dimension. The new across dimension is applied to the re-sizeable windows within the specified row when the dock is redrawn.

It is noted that the values contained in the Pixel Position in Row field 108 for each row are determined by the distance of the top/left edge of the horizontally/vertically oriented row from the top/left edge of the horizontal/vertical dock. Therefore, during step 406, new values are designated in the Pixel Position of Row field 108 in the row record for all rows below the specified horizontal row (or to the right of a specified vertical row), if necessary, in accordance with a new largest across dimension for a docked window in the specified row. Control then passes to Return step 410.

There are instances when the along dimension of a dock may change, thus necessitating recalculation of the dock rows. Dock dimensions change when the dimensions of the parent application window are modified. Furthermore, in the illustrative embodiment of the invention where the horizontally oriented docks span substantially the entire width of the Parent Application Window, the along dimension of both vertically oriented docks changes when the across dimension of a horizontally oriented is modified. In such instances it is necessary for the affected docks to recalculate the contents of each dock row in accordance with a new along dimension for the dock.

Figure 19:
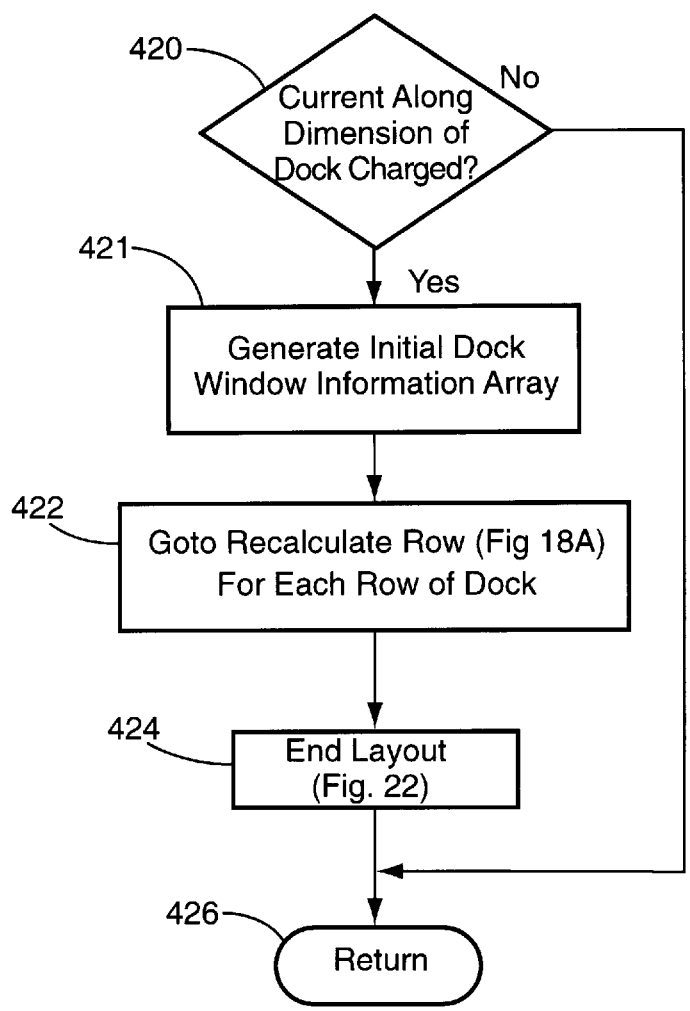
FIG. 19 is a flowchart summarizing the steps for updating the content and appearance of all rows on a dock in a window when the dimensions of the parent application window are altered.

Turning now to FIG. 19, the steps are summarized for updating a dock in accordance with a possible alteration in the along dimension of the dock. If, at step 420, the along dimension read from the Along Dimension field 102 for a specified dock has changed since the content and appearance of the specified dock were last updated, then control passes to step 421. At step 421 an array of dock window information is generated for the specified dock in the same manner described in step 320. Control then passes to step 422.

At step 422, the content and appearance of each row in the specified dock is recalculated in accordance with the steps illustrated in FIGS. 18A, 18B (described above). Next, at step 424, the dock workers for the windows on the specified dock containing the selected row are updated in accordance with the contents of the dock window information array for the specified dock. In addition, the graphical user interface is redrawn in accordance with the updated dock window information for the specified dock. These steps are summarized in FIG. 22 (described below). Control then passes to the Return step 426. If the along dimension from the Along Dimension field 102 for the specified dock has not changed, then control passes directly to the Return step 426.

The term "simultaneous", when used to describe the changes to the graphic user interface in response to a user's command is used to describe the resulting plurality of changes which are instituted in the graphical user interface in response to a single action by the user, such as a single drag and drop of a graphical user interface object.

Having described various ways for adding, moving and removing the re-sizeable windows in relation to docks, attention is now directed to simultaneously modifying the dimensions and position of a plurality of docked windows. The re-sizing operations are facilitated by graphic user interface features referred to as a re-sizing bar in the detailed description of the illustrative embodiment of the invention. The re-sizing bars comprise row minor splitter bars disposed between windows on a same dock row for simultaneously altering the along dimension of at least two re-sizeable windows in the dock row.

The re-sizing bars also comprise row major splitter bars disposed along a re-sizeable row on the relatively inward side of the row in relation to the border of the Parent Application Window to which the dock is associated. The row major splitter bar re-sizes the across dimension of all re-sizeable windows in an associated row. If the user drags and drops a row major splitter to modify the across dimension of a horizontally oriented row, then the along dimension of the vertically oriented windows, limited by the across dimension of the horizontally oriented docks, is also modified by the single act by the user of repositioning of the row major splitter bar. It is also noted that the work area of the parent application window is also simultaneously altered in response to the modification of the across dimension of any dock.

Figure 20:
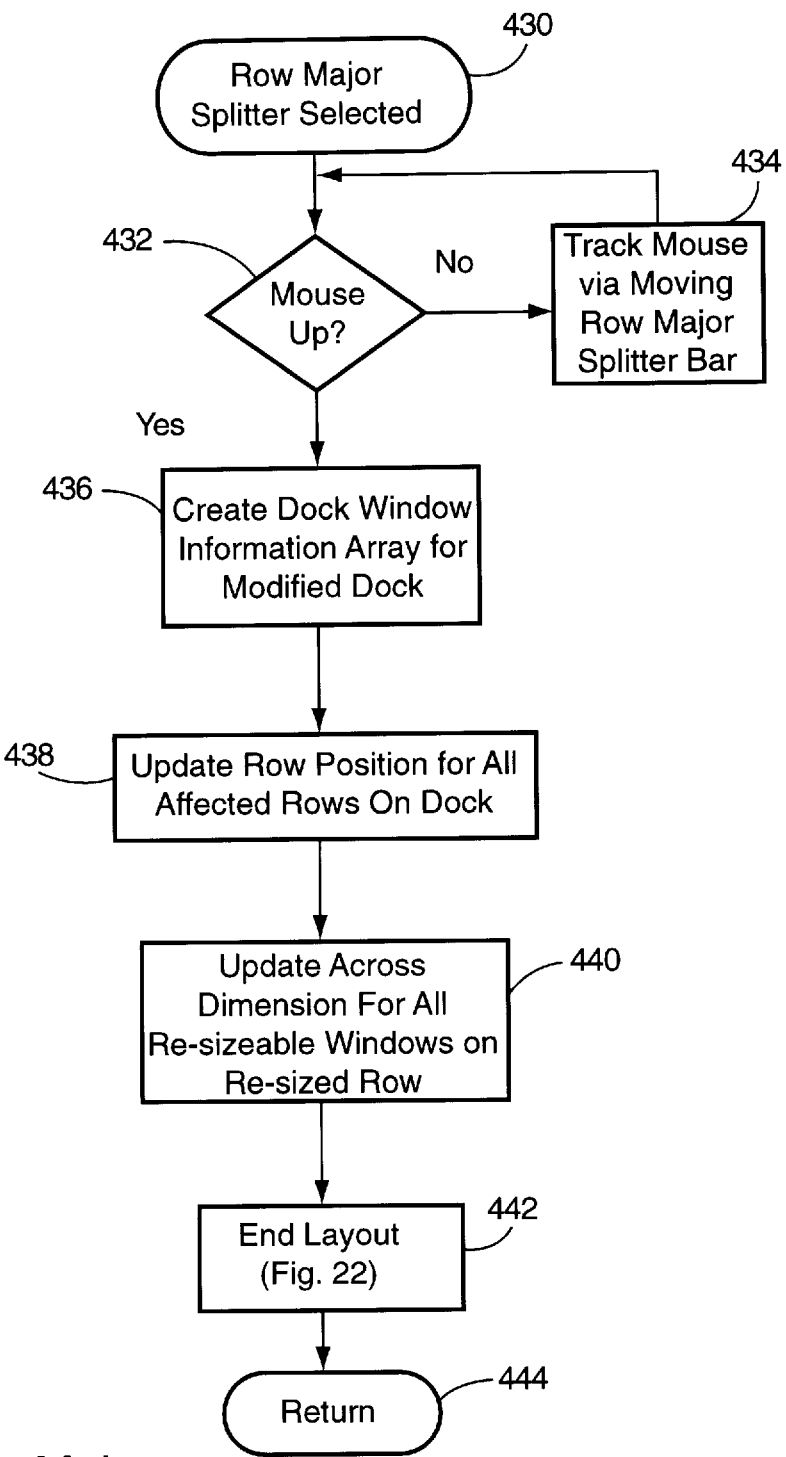
FIG. 20 is a flowchart summarizing the steps for modifying the across dimension of a dock row via a row major splitter bar.

Turning now to FIG. 20, the steps are shown for manipulating the across dimension of a dock row by means of a row major splitter. The procedure begins at step 430 when a user presses down on a mouse button while a display pointer is positioned over a detection region for a selected row major splitter bar such as row major splitter bar 28 in FIG. 3A. Control passes to step 432 where the state of the mouse button is tested in accordance with a tracking stage of row major splitter bar manipulation. If the mouse button is still depressed, then control passes to step 434 and the across direction component of the change in position of the display pointer is applied to the selected row major splitter bar. The graphic user interface display is updated to reflect the change in position of the row major splitter bar by generating a tracking rectangle of the same dimensions as the row major splitter bar which is used to track the repositioning of the row major splitter bar until the user drops the row major splitter bar. A row may be re-sized via a row major splitter up to the point where the re-sized row consumes the work area. Alternative limits to the repositioning of the row major splitter (at maximum and minimum sizes for the row) will be known to those skilled in the art in view of the described illustrative docking windows interface. The repositioning of the displayed row major bar will not exceed these limits. Control then returns to step 432.

If, at step 432, the mouse button has been released, then control passes to step 436, and steps are commenced for updating the display in accordance with the "drop" position of the selected row major splitter bar. At step 436, an array of dock window information is generated having records of the type illustrated in FIG. 11. Each record corresponds to one of the docked windows on the dock having the selected row major splitter bar. In the example in FIG. 3A, the bottom dock includes two windows and therefore two records are included in the array of dock window information generated when a user re-positions the row major splitter bar 28.

It is noted that the values contained in the Pixel Position in Row field 108 for each row are determined by the distance of the top edge (or left edge in the case of vertical docks) of the row from the top (or left) edge of the dock. Therefore, during step 438, new values are designated in the Pixel Position of Row field 108 in the row record for all rows below (or to the right of) the row having a re-sized across dimension, if necessary, in accordance with a new across dimension for the re-sized row. The previous values stored in the Pixel Position of Row field 108 for each row record are modified by an amount equal to the change in position of the row major splitter bar. Control then passes to step 440.

After generating the array of dock window information for the selected dock, control passes to step 440 and a new value is stored in the Across Dimension field 148 for each dock window information record for the re-sizeable windows in the selected row in accordance with the new position of the row major splitter. Thus, all re-sizeable windows in the row will be re-sized when the row is redrawn in accordance with the new across dimension for the selected row. Control then passes to step 442.

At step 442, the steps are performed for carrying out the changed dimensions of the specified dock in the graphical user interface. This includes updating the dimensions and content of any vertical docks which were affected by a change in the across dimension of a horizontal dock. These steps are summarized in FIG. 22 (described below). Control then passes to Return step 444.

Figure 21:
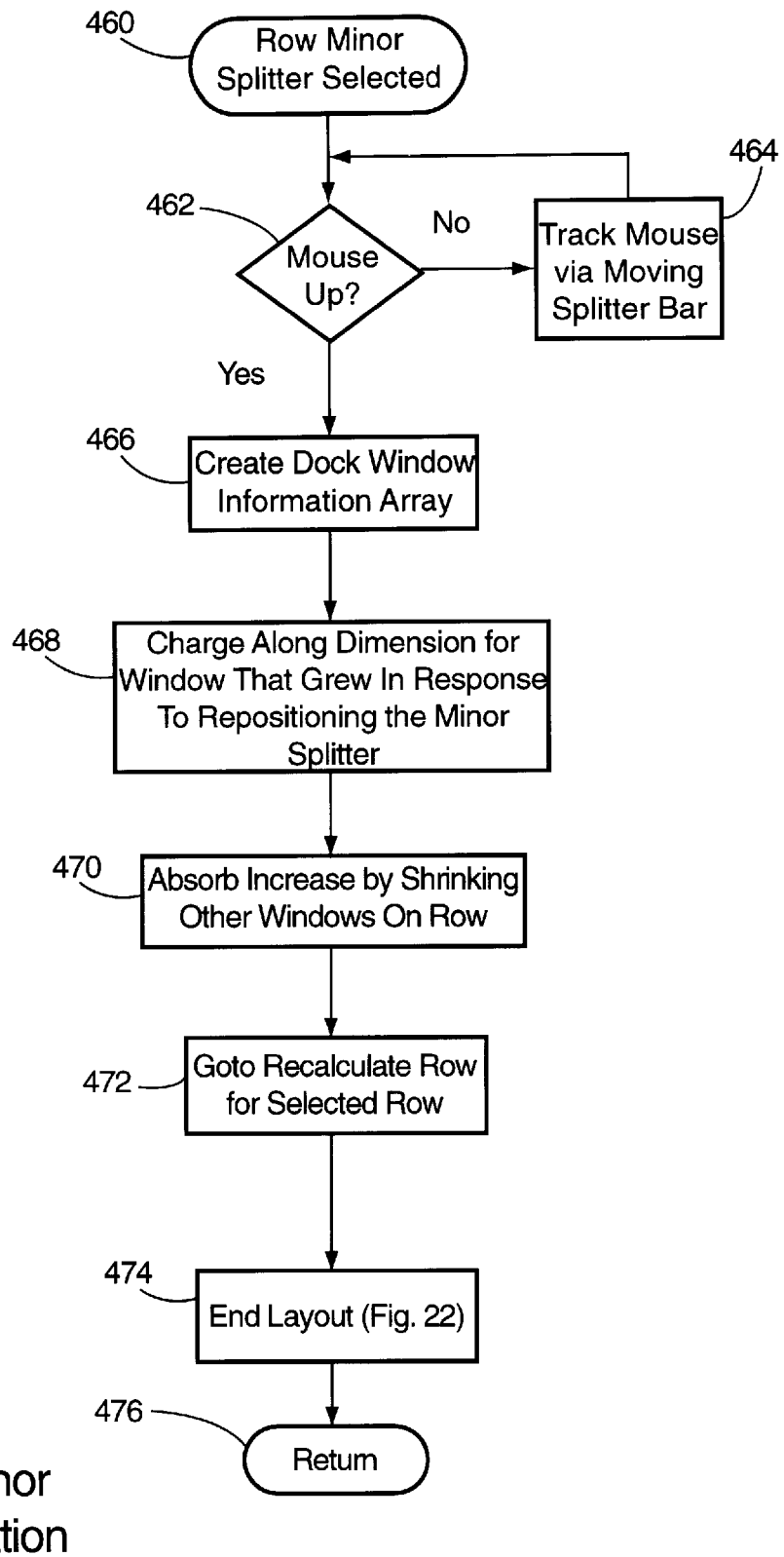
FIG. 21 is a flowchart summarizing the steps for modifying the along dimension of a plurality re-sizeable windows on a dock row via a single relocation of a row minor splitter bar.

Turning now to FIG. 21, the steps are summarized for simultaneously modifying the dimensions and/or position of at least two windows in a same dock row. The procedure begins at step 460 when a user presses down on a mouse button while a display pointer is positioned over a detection region for a selected row minor splitter bar such as row minor splitter bar 29 in FIG. 3A. Control passes to step 462 where the state of the mouse button is tested in accordance with a tracking stage of row minor splitter bar manipulation. If the mouse button is still depressed, then control passes to step 464 and the along direction component of the change in position of the display pointer is applied to the selected row minor splitter bar. The graphic user interface display is updated to reflect the change in position of the row minor splitter bar by generating a tracking rectangle of the same dimensions as the row minor splitter bar which is used to track the repositioning of the row minor splitter bar until the user drops the row minor splitter bar. Limits to the repositioning of the row minor splitter are reached when the windows on the row associated with the selected row minor splitter on the shrinking side of the row minor splitter have reached their minimum widths. This limit is not enforced however until the along dimensions and positions of the windows on the row are recalculated in step 470 below. Control then returns to step 462.

If, at step 462, the mouse button has been released, then control passes to step 466, and steps are commenced for updating the content and appearance of the graphical user interface in accordance with the "drop" position of the selected row minor splitter bar. At step 466, an array of dock window information is generated having records of the type illustrated in FIG. 11. Each record corresponds to one of the docked windows on the dock associated with the selected row minor splitter bar. In the example in FIG. 3A, the bottom dock includes two windows and therefore two records are included in the array of dock window information generated when a user re-positions the row minor splitter bar 29.

After generating the array of dock window information for the selected dock, control passes to step 468 and the along dimension field 146 of a dock window information record for an expanding window that increased in size as a result of the repositioning of the row minor splitter is updated in accordance with the new position of the row minor splitter. This value may be replaced if it is determined later that the other re-sizeable windows within the row containing the selected row minor splitter bar could not shrink sufficiently to absorb the increase in size of the expanding window. Control then passes to step 470.

At step 470, the windows on the shrinking side of the selected row minor splitter bar are serially reduced to compensate to the increase in the along dimension of the expanding window. The change in the along dimension is absorbed first by a first re-sizeable window nearest to the selected row minor splitter bar on the shrinking side. If the first re-sizeable window successfully absorbs the change in the along dimension, then control passes to step 472. Otherwise the along dimension of a second re-sizeable window next nearest to the row minor splitter is reduced in size in order to absorb the remainder of the increase by the expanding window. This reducing of the size of windows on the shrinking side of the row minor splitter continues until the increase has been completely absorbed by the window(s) on the shrinking side of the row minor splitter or no reducible windows remain on the shrinking side of the row minor splitter bar.

Next, at step 472, the size and position of the docked windows are recalculated and the positions of the row minor splitter bars are adjusted on the row containing the selected row minor splitter. The steps for updating the content and appearance of the row are summarized in FIGS. 18A, 18B (described above). Control passes to step 474

At step 474, the dock workers for the windows on a specified dock containing the selected row are updated in accordance with the contents of the dock window information array for the specified dock. In addition, the graphical user interface is redrawn in accordance with the contents of the dock window information array for the specified dock. These steps are summarized in FIG. 22 (described below). Control then passes to Return step 476.

Figure 22:
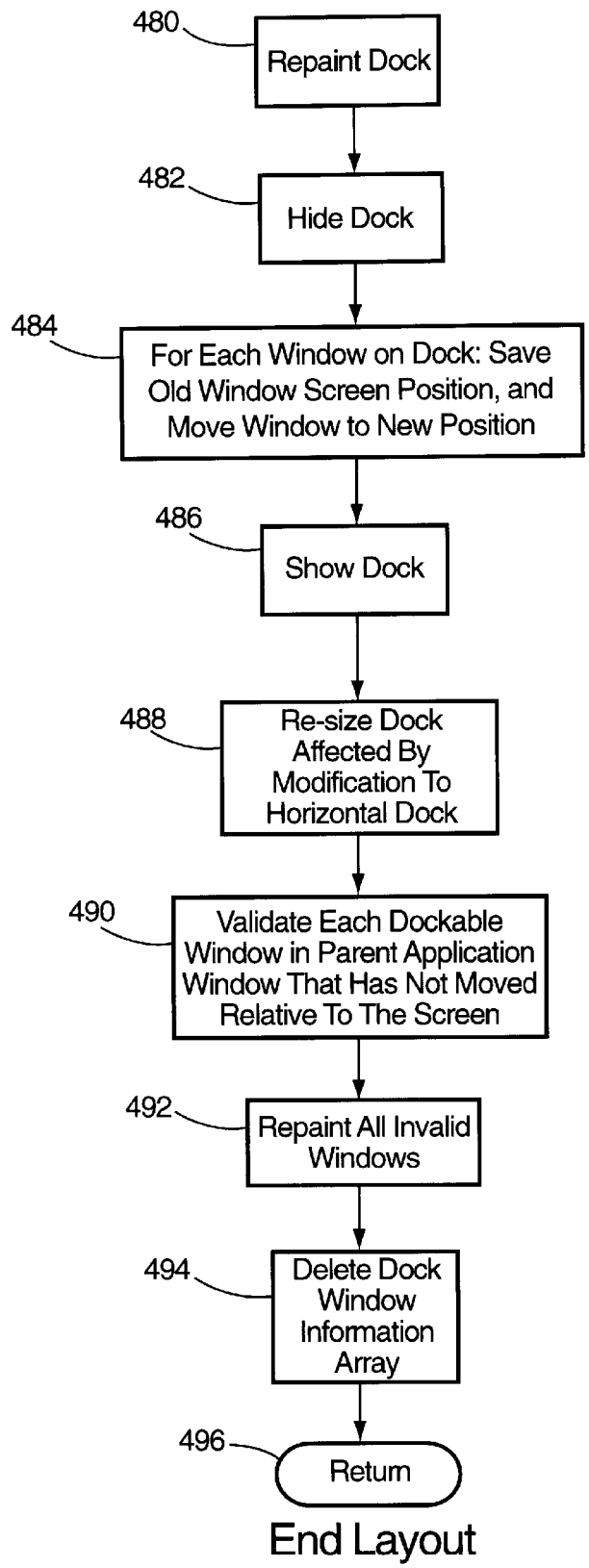
FIG. 22 is a flowchart summarizing the steps for recalculating all docks affected by a change to a dock and updating the entire screen in accordance with a user action modifying at least one dock.

Turning now to FIG. 22, the steps are summarized for updating a portion of a graphical user interface associated with a recalculated dock, carrying out any additional recalculations to other docks affected by the changes to the recalculated dock, and then re-painting the display to reflect the current state of all the docks. At step 480, a specified dock is repainted in it previous state (prior to the action which caused the dock to be updated) in order to validate all windows on the specified dock. Control then passes to step 482 wherein the specified dock is designated as hidden. While in the hidden state, the "WINDOWS" (TM) operating system cannot repaint the portion of the graphical display interface allocated to the specified dock. Control then passes to step 484.

At step 484, a sequence of two operations are performed on each window contained in the specified dock. First, the old screen position of a window is saved. Second, the window is assigned a position on the screen maintained by the "WINDOWS" (TM) operating system in accordance with the dock window information array information and the relative position of the dock on the screen. After all windows contained in the specified dock have been processed in step 484, control passes to step 486.

At step 486, the "WINDOWS" (TM) operating system is requested to show the dock thereby invalidating all of the windows on the dock. At this point, the operating system would re-paint all of the windows contained in the specified dock. Control passes to step 488.

Modifying the across dimension of a horizontal dock row causes re-sizing of the across dimension of the associated horizontal dock. This, in turn, causes re-sizing of the along dimension of the vertical docks. Therefore, at step 488, if it is determined that the across dimension of a horizontal dock row has changed, then both the left dock and the right dock are re-calculated in accordance with a new along dimension for both docks resulting from the modification of the across dimension of a horizontal dock row. The recalculation of the vertical docks is accomplished by executing the steps summarized in FIG. 19 upon each vertical dock in accordance with the modified along dimension for the vertical docks. Control then passes to step 490.

It is desirable to limit repainting of the graphical user interface display to only those display features that have been moved on the graphical user interface display space. Therefore, at step 490 the old positions of dockable windows saved during step 484 are compared to the current positions of the dockable windows. All dockable windows which have not moved on the graphical user interface are validated (and will not be repainted). Control then passes to step 492.

At step 492, all of the dockable windows which were not validated during step 490 are repainted by the operating system. After the windows and docks have been repositioned and repainted on the graphical user interface, the temporary data structures generated to carry out the changes are no longer needed. Therefore, control passes to step 494 wherein the array of dock window information associated with the specified dock is deleted. Control then passes to Return step 496.

A dockable window may be hidden from view on the display screen by assigning a dockable window to the hidden dock position in the Dock Position field 84 for the dockable window. This may occur while the dockable window is located on one of the docks or in the floating state. In any event when the window is hidden, the position of the window is stored in the Dock Position field 95 of the dock worker for the dockable window. If the dockable window is docked to one of the docks, then the row with which the dockable window is currently associated is calculated from the current position of the docked window, and the row identification corresponding to the row is stored in the Row Identification field 96. In addition, the position of the window in the dock row is recorded in the Position field 97, the along dimension of the docked window is recorded in the Along Dimension field 98, and the across dimension of the docked window is recorded in the Across Dimension field 99.

Figure 23:
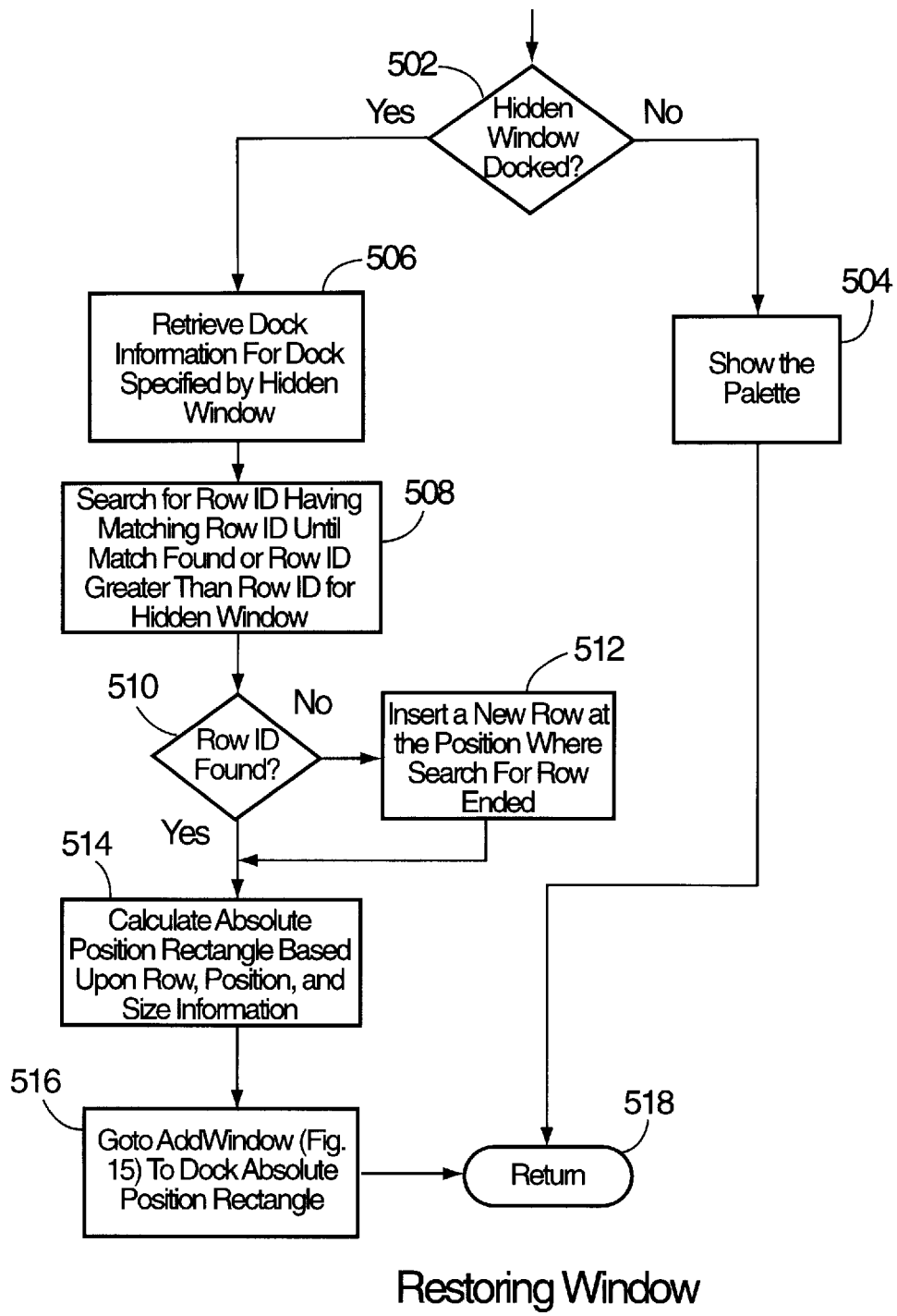
FIG. 23 is a flowchart summarizing the steps for automatically adding a window to a graphical user interface display from a hidden state.

It has previously been explained that a dockable window may be recalled from a hidden mode and added directly to a dock upon which the dockable window was previously displayed. Turning now to FIG. 23, the steps are summarized for recalling a dockable window in a dock from a previously hidden state. First, at step 502, it is determined whether the hidden dockable window was previously displayed in a docked state. If the hidden dockable window was previously not docked, then control passes to step 504 and the window is displayed as a palette in accordance with the position and size information stored in the Dock Placement field 94 of the window. Control then passes to Return step 518.

If, at step 502, the hidden dockable window was previously docked, then control passes to step 506, and the position and size data for the hidden dockable window is obtained from the Dock Placement field 94 for the hidden dockable window. Control then passes to step 508.

At step 508, the row identification fields 110 for the rows in the dock, corresponding to the Dock Position field 95 of the hidden dockable window, are compared to the row specified in the Row Identification field 96 of the hidden dockable window. The comparison of row identification values continues until a matching row in the dock is identified, or the row identification for a row in the specified dock exceeds the hidden dockable window's row identification. Control then passes to step 510.

If, at step 510 it is determined that no matching row identification was found in the specified dock, then control passes to step 512. At step 512, a new row is inserted at a row position on the dock in accordance with the relative values of the row identifications. The Pixel Position of Row fields 108 are adjusted for each of the rows whose position with respect to the top/left edge of the dock has changed as a result of the adding of a new row. Therefore, in accordance with a particular desirable aspect of the illustrative embodiment of the present invention, a row can be hidden and then replaced in a same relative position with respect to the currently existing rows on a dock based upon the row identification values associated with each row. After inserting the new row, control passes to step 514. If, at step 510 a matching row is identified in the specified dock, then control passes to step 514.

At step 514, an absolute rectangle is calculated for the hidden dockable window based upon the identified row, position in row, and size information provided in the Dock Placement field 94 of the dockable window, and the dock row position information provided by the specified dock. The calculated absolute rectangle is positioned so that its top/left edge lies within the identified row on the horizontal/vertical dock. Control then passes to step 516.

At step 516, the hidden dockable window is replaced on its associated dock. This is accomplished by executing the steps of adding a window to a dock summarized in FIG. 15 (described above) based upon the absolute rectangle calculated during step 516. Control then passes to Return step 518.

Figure 24:
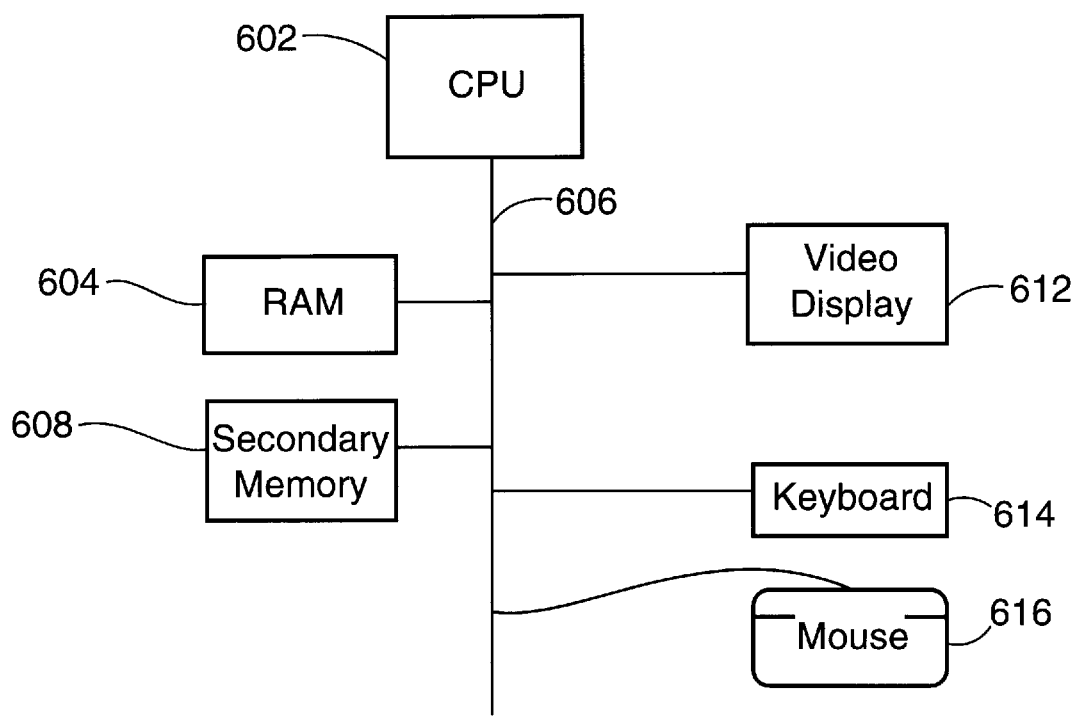
FIG. 24 is a schematic drawing of a computer system incorporating the present invention.

The illustrative embodiment of an apparatus and method for docking windows on a graphical user interface is carried out upon the general type of personal computer system schematically illustrated in FIG. 24. The personal computer system comprises a central processing unit (CPU) 602. The CPU is preferably an Intel x86 processor. The CPU is coupled by means of a bus 606 in a known manner to a random access memory (RAM) 604. Typically, the RAM 604 stores at least 4 megabytes of information. Increased performance occurs however when 8 megabytes of storage space are provided in the RAM 604. The CPU 602 is also coupled to a non-volatile secondary memory 608 for storing various system and applications routines and programs. Today, this memory comprises at least one hundred megabytes of memory storage space and typically has even more. The CPU 602 is coupled in known manner to a number of user interface components including a display 612. The display 612 may be any of a number of known display devices including, for example, monochrome and color cathode ray tubes and LCD displays and in accordance with the present invention displays a set of re-sizeable docked windows.

A user controls the positioning of a pointing mechanism comprising, for example, a display pointer on a display screen of the display 612 via a mouse 616 and/or a keyboard 614 or other suitable user controlled selection device such as a trackball to facilitate the submission of graphic user interface selection signals to the CPU 602 in order to dock windows and to re-size docked windows on the display. Suitable user controlled graphical selection devices provide a clicking mechanism which transmits a signal at least when a user presses the clicking mechanism.

The computer system hardware depicted in FIG. 24 is a representative hardware configuration of a computer system embodying the present invention. It would of course be understood by one of ordinary skill in the art that the present invention encompasses other computer system hardware configurations and is not limited to the computer system hardware configuration schematically illustrated in FIG. 24 and described above.

While the preferred embodiment of the invention has been implemented utilizing the "WINDOWS" (TM) operating system programming environment, the invention defined by the claims appended below is intended to cover more than just the graphical user interface entities created by means of a "WINDOWS" (TM) operating system call to create a window. The invention defined by the appended claims is intended to include a re-positionable graphical user interface entity having a perimeter defining a region of a graphical user interface allocated to an associated computer resource. Furthermore, it is noted that the term "GUI box", used to describe the present invention, is intended to include non-box shaped re-positionable and re-sizeable GUI elements which occupy a defined region on a graphical user interface.

Furthermore, while the preferred embodiment of the invention has been described, it would be known to one of ordinary skill in the area of user interfaces for computers and operating systems in general to make certain modifications to the described method and system which would not depart from the scope and spirit of the invention. In particular, it will be readily appreciated by those skilled in the art that the present invention can be carried out in a number of different ways, including rearranging the steps summarized in the flow charts or using alternative appropriate status variables, records, or other mechanisms to describe the state of a graphical user interface incorporating the present invention.

Further alterations to the described embodiment of the invention which would not depart from the broadest intended scope of the invention include, without limitation, modifying the number and relative positions of the docks on the display interface and the mechanisms for modifying the content and appearance of the docks. While the illustrative embodiment of the present invention has been described as including a mouse controlled pointer, one may alternatively substitute a light pen, track ball, or other suitable user controlled selection device. One may also utilize the present invention within other computer configurations such as a local area network, or a group of computer work stations sharing a mainframe operating system. The scope of the claimed invention is not to be limited to the embodiments described herein. Rather, the scope of the present invention is intended to cover any equivalent devices and methods which fall within the spirit of the invention as defined by the appended claims.

What is claimed is:

1. A method for arranging re-sizeable graphical user interface (GUI) boxes on a GUI having at least one dock, the size of the re-sizeable GUI boxes being alterable by means of re-sizing zones associated with edges of the re-sizeable GUI boxes, said method comprising the steps of:

selecting a first docking region on the at least one dock to receive a first GUI box;

determining an interval on one dimension of the first docking region for displaying the first GUI box on the GUI; and re-sizing a re-sizeable GUI box associated with the at least one dock without manipulation by a user of a re-sizing zone associated with the re-sizeable GUI box in order to display the first GUI box within the interval.

2. The method of claim 1 wherein the re-sizing a re-sizeable GUI box step comprises modifying an along dimension of the re-sizeable GUI box.

3. The method of claim 1 wherein the re-sizing a re-sizeable GUI box step comprises modifying an across dimension of the re-sizeable GUI box.

4. The method of claim 1 wherein the re-sizeable GUI box associated with the at least one dock is the first GUI box.

5. The method of claim 1 wherein the re-sizeable GUI box associated with the at least one dock is a second GUI box associated with the at least one dock.

6. The method of claim 5 wherein the first and second GUI boxes occupy a first dock row, the method further comprising the steps of:

selecting a minor splitter detection region disposed in a first location on the first dock row;

re-positioning the minor splitter detection region to a second location on the first dock row in accordance with a user initiated command;

determining a new along dimension for the second GUI box and a new set of boundaries for the first and second GUI boxes in accordance with the re-positioning of the minor splitter detection region to the second location.

7. The method of claim 6 wherein a third GUI box is disposed on the first dock row, further comprising the step of:

determining a new along dimension and set of boundaries for the third GUI box in accordance with the re-positioning of the minor splitter detection region to the second location.

8. The method of claim 7 wherein the first GUI box has a re-sizeable along dimension and a minimum along dimension, the third GUI box is disposed next to the first GUI box, and the third GUI box is not disposed next to the second GUI box, further comprising the step of reducing the along dimension of the first GUI box to the minimum along dimension in accordance with the re-positioning of the minor splitter detection region to the second location.

9. The method of claim 7 wherein the first GUI box has a fixed along dimension, the third GUI box is disposed next to the first GUI box, and the third GUI box is not disposed next to the second GUI box, further comprising the steps of moving the borders of the first GUI box and maintaining a same set of dimensions for the first GUI box in accordance with the re-positioning of the minor splitter detection region to the second location.

10. The method of claim 5 further comprising the steps of:

selecting a major splitter detection region disposed in a first location;

re-positioning the major splitter detection region to a second location in accordance with a user initiated command; and determining a new across dimension for the second GUI box and a new set of absolute GUI boundaries for the first GUI box and the second GUI box in accordance with the re-positioning of the major splitter detection region to the second location.

11. The method of claim 1 wherein the first GUI box includes a first display mode for displaying the first GUI box on the graphical user interface when the first GUI box is not associated with a docking region, and a second display mode for displaying the first GUI box when the first GUI box associates with a docking region, and wherein said method further comprises the step of switching from the first display mode to the second display mode when the first GUI box becomes associated with a docking region.

12. The method of claim 11 wherein both the first display mode and second display mode include a document space.

13. The method of claim 11 wherein the first display mode for the first GUI box includes a title bar and the second display mode for the first GUI box does not include the title bar.

14. The method of claim 11 wherein the first display mode for the first GUI box includes a re-size border and the second display mode for the first GUI box does not include the re-size border.

15. The method of claim 11 wherein the first display mode for the first GUI box includes a close box for closing the process associated with the first GUI box and the second display mode does not include the close box.

16. The method of claim 11 wherein the second display mode for the first GUI box includes a border for moving the first GUI box and the first display mode for the first GUI box does not include the border for moving the first GUI box.

17. The method of claim 1 further comprising the step of re-defining a work area region of a parent GUI box containing the at least one dock to exclude from a maximum work area region of the parent GUI box the portion of the parent GUI box occupied by GUI boxes associated with the at least one dock.

18. The method of claim 1 wherein the at least one dock comprises a plurality of docks, and wherein the selecting a first docking region step comprises determining a first dock of the plurality of docks to which the first GUI box is to be added.

19. The method of claim 1 wherein the at least one dock includes a first dock comprising a set of rows, and wherein the selecting a first docking region step comprises determining a first row of the set of rows to which the first GUI box is to be added.

20. The method of claim 19 wherein the first row comprises at least one previously docked GUI box, and further comprising the step of determining a relative order in the row for placing the first GUI box in relation to the at least one previously docked GUI box.

21. The method of claim 1 wherein the first GUI box includes a dock placement field and wherein the method comprises the further steps of:

transforming the display state of the first GUI box to a hidden state and storing in the dock placement field information identifying a first display region;

receiving a user command signal indicating that the first GUI box is to be transformed back to a displayed state from the hidden state and in response displaying the first GUI box in accordance with the information identifying the first display region.

22. The method of claim 21 wherein the information identifying the first display region comprises a dock identification.

23. The method of claim 22 wherein the information identifying the first display region further comprises a row identification for a row within the identified dock.

24. The method of claim 23 wherein the information identifying the first display region further comprises a position of the first GUI box within the identified row.

25. The method of claim 21 wherein the information identifying the first display region comprises size information associated with the first GUI box.

26. A method for modifying a set of boundaries associated with a plurality of GUI boxes by executing a single user initiated GUI re-sizing operation, the method comprising the steps of:

selecting a re-sizing detection region disposed in a first location adjacent to a first GUI box and a second GUI box;

re-positioning the re-sizing detection region to a second location in accordance with a user initiated command; and defining a new set of boundaries for the first GUI box and the second GUI box in accordance with the re-positioning of the re-sizing detection region to the second location.

27. The method of claim 26 wherein the re-sizing detection region is disposed between the first GUI box and the second GUI box in a row, and further comprising the step of determining a new along dimension for the first GUI box in accordance with the re-positioning of the re-sizing detection region to the second location.

28. The method of claim 26 wherein the re-sizing detection region is disposed along a row including both the first GUI box and the second GUI box, further comprising the step of determining a new across dimension for the first GUI box in accordance with the re-positioning of the re-sizing detection region to the second location.

29. The method of claim 26 wherein the first GUI box is associated with a first dock disposed on a first boundary of a primary GUI box, the second GUI box is associated with a second dock disposed on a second boundary of the primary GUI box perpendicular to the first boundary, and the re-sizing detection region is disposed on an edge of the second GUI box parallel to the second boundary of the primary GUI box, said method further comprising the steps of:

determining a new along dimension for the first GUI box in accordance with the repositioning of the re-sizing detection region to the second location.

30. The method of claim 29 further comprising the steps of:

receiving a command re-sizing the dimension of the primary GUI box; and re-sizing the along dimension of at least a one of the first and second docks while maintaining the across dimension of both the first and second docks.

31. A computer system including a graphical user interface (GUI) having at least one dock facilitating the arranging of re-sizeable GUI boxes, the size of the re-sizeable GUI boxes being alterable by means of re-sizing zones associated with edges of the re-sizeable GUI boxes when the re-sizable GUI boxes are not associated with the at least one dock, the GUI comprising:

a first docking region on the at least one dock for accepting a first GUI box;

an interval on one dimension of the first docking region for displaying the first GUI box on the GUI; and means for re-sizing a re-sizeable GUI box associated with the at least one dock without manipulation by a user of a one of the re-sizing zones associated with the re-sizeable GUI box in order to display the first GUI box within the interval.

32. The computer system of claim 31 wherein the means for re-sizing a re-sizeable GUI box comprises means for modifying an along dimension of the re-sizeable GUI box.

33. The computer system of claim 31 wherein the means for re-sizing a re-sizeable GUI box comprises means for modifying an across dimension of the re-sizeable GUI box.

34. The computer system of claim 31 wherein the re-sizeable GUI box associated with the at least one dock is the first GUI box.

35. The computer system of claim 31 wherein the re-sizeable GUI box associated with the at least one dock is a second GUI box associated with the at least one dock.

36. The computer system of claim 35 further comprising:

a minor splitter detection region disposed in a first location on a first dock row containing the first and second GUI boxes;

means for re-positioning the minor splitter detection region to a second location on the first dock row in accordance with a user initiated command;

means for calculating new along dimensions for GUI boxes within the first dock row including:

means for determining a new along dimension for the second GUI box and a new set of boundaries for the first and second GUI boxes in accordance with the re-positioning of the minor splitter detection region to the second location.

37. The computer system of claim 35 further comprising:

a major splitter detection region disposed in a first location;

means for re-positioning the major splitter detection region to a second location in accordance with a user initiated command; and means for calculating a new across dimension for the second GUI box and a new set of absolute GUI positions for the boundaries of the first GUI box and the second GUI box in accordance with the re-positioning of the major splitter detection region to the second location.

38. The computer system of claim 31 wherein the first GUI box includes a first display mode for displaying the first GUI box on the graphical user interface when the first GUI box is not associated with a docking region, and a second display mode for displaying the first GUI box when the first GUI box associates with a docking region, and wherein said computer system further comprises means for switching from the first display mode to the second display mode when the first GUI box becomes associated with a docking region.

39. The computer system of claim 38 wherein the first display mode for the first GUI box includes a title bar and the second display mode for the first GUI box does not include the title bar.

40. The computer system of claim 38 wherein the first display mode for the first GUI box includes a re-size border and the second display mode for the first GUI box does not include the re-size border.

41. The computer system of claim 38 wherein the second display mode for the first GUI box includes a border for moving the first GUI box and the first display mode for the first GUI box does not include the border for moving the first GUI box.

42. The computer system of claim 31 further comprising means for re-defining a work area region of a parent GUI box containing the at least one dock to exclude from a maximum work area region of the parent GUI box the portion of the parent GUI box occupied by GUI boxes associated with the at least one dock.

43. The computer system of claim 31 wherein the at least one dock comprises a plurality of docks, and wherein the computer system further comprises means for determining a first dock of the plurality of docks to which the first GUI box is to be added.

44. The computer system of claim 31 wherein the at least one dock includes a first dock comprising a set of rows, and wherein the computer system further comprises means for determining a first row of the set of rows to which the first GUI box is to be added.

45. The computer system of claim 31 wherein the first GUI box includes a dock placement field and wherein the computer system further comprises:

means for transforming the display state of the first GUI box to a hidden state and storing in the dock placement field information identifying a first display region;

means for receiving a user command signal indicating that the first GUI box is to be transformed back to a displayed state from the hidden state and in response displaying the first GUI box in accordance with the information identifying the first display region.

46. The computer system of claim 45 wherein the information identifying the first display region comprises a dock identification.

47. The computer system of claim 46 wherein the information identifying the first display region further comprises a row identification for a row within the identified dock.

48. The computer system of claim 47 wherein the information identifying the first display region further comprises a position of the first GUI box within the identified row.

49. The computer system of claim 31 wherein the information identifying the first display region comprises size information associated with the first GUI box.

50. A computer system for modifying a set of boundaries associated with a plurality of GUI boxes by executing a single user initiated GUI re-sizing operation, the computer system comprising:

means for selecting a re-sizing detection region disposed in a first location adjacent to a first GUI box and a second GUI box;

means for re-positioning the re-sizing detection region to a second location in accordance with a user initiated command; and means for defining a new set of boundaries for the first GUI box and the second GUI box in accordance with a value corresponding to the re-positioning of the re-sizing detection region to the second location.

51. The computer system of claim 50 wherein the re-sizing detection region is disposed between the first GUI box and the second GUI box in a row, and wherein the computer system further comprises means for determining a new along dimension for the first GUI box in accordance with a value corresponding to the re-positioning of the re-sizing detection region to the second location.

52. The computer system of claim 50 wherein the re-sizing detection region is disposed along a row including both the first GUI box and the second GUI box, and wherein the computer system further comprises means for determining a new across dimension for the first GUI box in accordance with a value corresponding to the re-positioning of the re-sizing detection region to the second location.

53. The computer system of claim 50 wherein the first GUI box is associated with a first dock disposed on a first boundary of a primary GUI box, the second GUI box is associated with a second dock disposed on a second boundary of the primary GUI box perpendicular to the first boundary, and the re-sizing detection region is disposed on an edge of the second GUI box parallel to the second boundary of the primary GUI box, said computer system further comprising means for determining a new along dimension for the first GUI box in accordance with a value corresponding to the repositioning of the re-sizing detection region to the second location.

54. The computer system of claim 53 further comprising the steps of:

means for receiving a command re-sizing the dimension of the primary GUI box; and means for re-sizing the along dimension of at least a one of the first and second docks while maintaining the across dimension of both the first and second docks.

55. A graphical user interface (GUI) box dock, associated with a primary GUI box, for facilitating sizing and placement of a plurality of GUI boxes within the primary GUI box by executing a single user interface re-sizing operation, the GUI box dock comprising:

a first docking region containing a re-sizeable first GUI box and a second GUI box associated with the dock; and a first re-sizing detection region disposed adjacent the re-sizeable first GUI box enabling a user to modify a dimension of the re-sizeable first GUI box as well as the absolute GUI positions of boundaries for the re-sizeable first GUI box and the second GUI box by re-positioning the first re-sizing detection region.

56. The GUI box dock of claim 55 wherein the first re-sizing detection region comprises a major splitter detection region disposed along a row containing both the re-sizeable first GUI box and the second GUI box, said major splitter detection region facilitating the adjusting of the across dimension of all re-sizeable GUI boxes via a single re-positioning of the major splitter detection region in accordance with a user command.

57. The GUI box dock of claim 55 wherein the first re-sizing detection region comprises a minor splitter detection region disposed between the re-sizeable first GUI box and a second GUI box, said minor splitter detection region adjusting the along dimension of at least the re-sizeable first GUI box.

58. A method for arranging re-sizeable graphical user interface (GUI) boxes on a GUI having at least one dock, the size of the re-sizeable GUI boxes being alterable by means of re-sizing zones associated with edges of the GUI boxes when the GUI boxes are not associated with a dock, said method comprising the steps of:

determining an interval on one dimension of a first docking region on a dock for displaying a first GUI box; and re-sizing a GUI box associated with the at least one dock without manipulation by a user of a one of the re-sizing zones associated with the GUI box in order to display the first GUI box within the interval.

59. A method for arranging graphical user interface (GUI) display elements on a GUI having at least one automatic GUI display element arrangement region, the size of the GUI display elements being alterable by means of re-sizing zones associated with edges of the GUI display elements when the GUI display elements are not associated with an automatic GUI display element arrangement region, said method comprising the steps of:

determining an interval on one dimension of a first region on an automated GUI display element arrangement region for displaying a first GUI box; and re-sizing a GUI display element associated with the at least one automatic GUI display element arrangement region without manipulation by a user of a one of the re-sizing zones associated with the GUI display element in order to display the first GUI display element within the interval.

60. A method for hiding and replacing a GUI box associated with an automatic GUI box arrangement region comprising the steps of:

transforming the display state of the GUI box to a hidden state and storing in a dock placement field information identifying a first display region for the GUI box, the information identifying a first display region including at least a row identification;

receiving a user command signal indicating that the GUI box is to be transformed back to a displayed state from the hidden state and in response displaying the first GUI box in accordance with the information identifying the first display region.

61. The method of claim 60 wherein the information identifying the first display region comprises a dock identification.

62. The method of claim 60 wherein the information identifying the first display region further comprises a position of the first GUI box within the identified row.

63. The method of claim 60 wherein the information identifying the first display region comprises size information associated with the first GUI box.

* * * * *

UNITED STATES PATENT AND TRADEMARK OFFICE
CERTIFICATE OF CORRECTION

PATENT NO. : 5,819,055
DATED : October 6, 1998
INVENTOR(S) : Brendan X. MacLean and Bradford A. Christian It is certified that errors appear in the above-identified patent and that said Letters Patent is hereby corrected as shown below:

ON THE TITLE PAGE ITEM [57],

ABSTRACT
Line 24: "resizeable" should read --re-sizeable--.

PAGE TWO:

OTHER PUBLICATIONS
In Column 1, line 25: "seeds" should read --speeds--.
In Column 2, line 3: insert --Simon, Barry, HP's Dashboard: another way to drive Windows," PC Magazine, Nov. 10, 1992, vol. 11(19), p. 53--.
In Column 2, line 19 "Simon, Barry, "The cabbage patch," PC Magazine, Sep. 29, 1992, vol. 11(16), p. 177."

In Column 23, line 5: insert a space between "a." and "At".
In Column 23, line 10: "resizeable" should read --re-sizeable--.

Signed and Sealed this

Thirteenth Day of April, 1999

Q. TODD DICKINSON

*Attest:*

*Attesting Officer*  *Acting Commissioner of Patents and Trademarks*